(12) United States Patent
Annaka et al.

(10) Patent No.: US 12,362,430 B2
(45) Date of Patent: Jul. 15, 2025

(54) FUNCTIONAL LAYER-EQUIPPED SEPARATOR FOR ELECTROCHEMICAL DEVICE AND ELECTROCHEMICAL DEVICE

(71) Applicant: ZEON CORPORATION, Tokyo (JP)

(72) Inventors: Koji Annaka, Tokyo (JP); Masanobu Sato, Tokyo (JP)

(73) Assignee: ZEON CORPORATION, Tokyo (JP)

(*) Notice: Subject to any disclaimer, the term of this patent is extended or adjusted under 35 U.S.C. 154(b) by 683 days.

(21) Appl. No.: 17/595,779

(22) PCT Filed: May 29, 2020

(86) PCT No.: PCT/JP2020/021428
§ 371 (c)(1),
(2) Date: Nov. 24, 2021

(87) PCT Pub. No.: WO2020/246394
PCT Pub. Date: Dec. 10, 2020

(65) Prior Publication Data
US 2022/0231378 A1    Jul. 21, 2022

(30) Foreign Application Priority Data
Jun. 3, 2019    (JP) .................. 2019-103928

(51) Int. Cl.
*H01M 50/449* (2021.01)
*H01M 50/411* (2021.01)
(Continued)

(52) U.S. Cl.
CPC ....... *H01M 50/449* (2021.01); *H01M 50/411* (2021.01); *H01M 50/443* (2021.01); *H01M 50/446* (2021.01); *H01M 50/489* (2021.01)

(58) Field of Classification Search
CPC .................................................. H01M 50/449
See application file for complete search history.

(56) References Cited

U.S. PATENT DOCUMENTS 10,295,926 B2    5/2019    Kawamoto et al.
2011/0300430 A1*  12/2011    Usami ................. H01M 50/417
                                                        429/188

(Continued)

FOREIGN PATENT DOCUMENTS

JP    2011258351 A    12/2011
JP    2012204303 A    10/2012

(Continued)

OTHER PUBLICATIONS

"Maximum." Merriam-Webster.com Dictionary, Merriam-Webster, https://www.merriam-webster.com/dictionary/maximum. Accessed Jul. 19, 2024. (Year: 2024).*

(Continued)

*Primary Examiner* — Allison Bourke
*Assistant Examiner* — Kayla Elaine Clary
(74) *Attorney, Agent, or Firm* — KENJA IP LAW PC

(57) ABSTRACT

A functional layer-equipped separator for an electrochemical device includes a separator substrate and a functional layer for an electrochemical device disposed on at least one surface of the separator substrate. The functional layer for an electrochemical device contains inorganic particles and a particulate polymer. A surface of the functional layer for an electrochemical device has a maximum height Sz of 2.5 μm or more. The functional layer for an electrochemical device includes one or more protrusions each containing the particulate polymer at a surface thereof.

11 Claims, 3 Drawing Sheets

(51) Int. Cl.
*H01M 50/443* (2021.01)
*H01M 50/446* (2021.01)
*H01M 50/489* (2021.01)

(56) References Cited

U.S. PATENT DOCUMENTS

| | | | | |
|---|---|---|---|---|
| 2013/0059192 | A1* | 3/2013 | Kajita | H01M 50/457 |
| | | | | 429/143 |
| 2015/0333308 | A1* | 11/2015 | Toyoda | H01M 10/0525 |
| | | | | 429/144 |
| 2018/0053963 | A1 | 2/2018 | Tanaka | |
| 2018/0309108 | A1* | 10/2018 | Shin | H01M 50/42 |
| 2021/0184311 | A1* | 6/2021 | Lefebvre | H01G 9/02 |

FOREIGN PATENT DOCUMENTS

| | | |
|---|---|---|
| JP | 2015082459 A | 4/2015 |
| JP | 2017152268 A | 8/2017 |
| JP | 2019020578 A | 2/2019 |
| WO | 2013151144 A1 | 10/2013 |

OTHER PUBLICATIONS

"Arithmetic mean." Merriam-Webster.com Dictionary, Merriam-Webster, https://www.merriam-webster.com/dictionary/arithmetic%20mean. Accessed Jul. 19, 2024. (Year: 2024).*

Dec. 20, 2022, the Extended European Search Report issued by the European Patent Office in the corresponding European Patent Application No. 20819558.6.

Aug. 4, 2020, International Search Report issued in the International Patent Application No. PCT/JP2020/021428.

Sep. 27, 2023, Communication pursuant to Article 94(3) EPC issued by the European Patent Office in the corresponding European Patent Application No. 20819558.6.

Dec. 7, 2021, International Preliminary Report on Patentability issued in the International Patent Application No. PCT/JP2020/021428.

* cited by examiner

FUNCTIONAL LAYER-EQUIPPED SEPARATOR FOR ELECTROCHEMICAL DEVICE AND ELECTROCHEMICAL DEVICE

TECHNICAL FIELD

The present disclosure relates to a functional layer-equipped separator for an electrochemical device and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

A lithium ion secondary battery, for example, generally includes battery members such as a positive electrode, a negative electrode, and a separator that isolates the positive electrode and the negative electrode from each other and prevents short circuiting between the positive and negative electrodes.

In recent years, studies have been made to further improve separators with the aim of achieving even higher lithium ion secondary battery performance.

As one specific example, Patent Literature (PTL) 1 proposes a separator obtained by forming a heat-resistant layer containing non-conductive particles and a binder on a separator substrate and then further forming an adhesive layer containing a specific particulate polymer on the heat-resistant layer. PTL 1 reports that the use of a separator having an adhesive layer on a heat-resistant layer enables good adhesion between the separator and an electrode and improves battery characteristics of a secondary battery.

CITATION LIST

Patent Literature

PTL 1: WO2013/151144A1

SUMMARY

Technical Problem

However, production of the conventional separator described above that includes a heat-resistant layer and an adhesive layer requires formation of a heat-resistant layer on a separator substrate and formation of an adhesive layer on the heat-resistant layer to be performed sequentially, resulting in a complicated production process.

In response to this problem, it may be possible to simplify the production process of a separator and increase productivity by, for example, forming a single layer that can display heat resistance and adhesiveness simultaneously (hereinafter, such a layer is also referred to as a "functional layer") on a separator substrate instead of separately forming a heat-resistant layer and an adhesive layer.

The inventors focused on the fact that by using a composition containing a component that contributes to heat resistance and a component that contributes to adhesiveness, it becomes possible for heat resistance and adhesiveness to be displayed simultaneously in an obtained functional layer. However, studies conducted by the inventors revealed that in the case of a functional layer that is formed using a composition obtained simply by mixing a component that contributes to heat resistance and a component that contributes to adhesiveness, there is insufficient adhesiveness between members in a production process of an electrochemical device (hereinafter, also referred to as "process adhesiveness"). It also became clear that due to a trade-off relationship between heat resistance and adhesiveness, it is difficult to form a functional layer that can display excellent heat resistance while also ensuring sufficient adhesiveness. Moreover, it is desirable for an electrochemical device produced using a functional layer to have good injectability of electrolyte solution (hereinafter, referred to as "electrolyte solution injectability") in production of the electrochemical device.

Accordingly, an object of the present disclosure is to provide a functional layer-equipped separator for an electrochemical device including a functional layer that has excellent process adhesiveness and heat resistance and that enables good electrolyte solution injectability.

Solution to Problem

The inventors conducted diligent studies to achieve the object set forth above. The inventors discovered that when a functional layer for an electrochemical device that contains inorganic particles and a particulate polymer, that has a surface having a maximum height Sz of not less than a specific value, and that includes one or more protrusions each containing the particulate polymer at a surface thereof is formed on a separator substrate, a functional layer-equipped separator for an electrochemical device including a functional layer that has excellent process adhesiveness and heat resistance and that enables good electrolyte solution injectability is obtained. In this manner, the inventors completed the present disclosure.

Specifically, the present disclosure aims to advantageously solve the problems set forth above, and a presently disclosed functional layer-equipped separator for an electrochemical device comprises: a separator substrate; and a functional layer for an electrochemical device disposed on at least one surface of the separator substrate, wherein the functional layer for an electrochemical device contains inorganic particles and a particulate polymer, a surface of the functional layer for an electrochemical device has a maximum height Sz of 2.5 μm or more, and the functional layer for an electrochemical device includes one or more protrusions each containing the particulate polymer at a surface thereof. When a functional layer for an electrochemical device that contains inorganic particles and a particulate polymer, that has a surface having a maximum height Sz of not less than a specific value, and that includes protrusions each containing the particulate polymer at the surface thereof is formed on a separator substrate in this manner, it is possible to provide a functional layer-equipped separator for an electrochemical device including a functional layer that has excellent process adhesiveness and heat resistance and that enables good electrolyte solution injectability.

Note that the "maximum height Sz" of the "surface" referred to in the present specification is a value in accordance with ISO 25178.

Moreover, the term "protrusion" as used in the present disclosure refers to part of a surface of a functional layer that protrudes 1 μm or more beyond a reference, which is taken to be the plane of arithmetic mean height Sa of the functional layer. When a protrusion is said to "contain the particulate polymer at a surface thereof", this means that when the functional layer-equipped separator is individually observed, the particulate polymer is in an exposed state at the surface of a protrusion included in the functional layer. Moreover, "one or more protrusions each containing the particulate polymer at a surface thereof" that are included in the functional layer can be identified by SEM-EDX (scanning electron microscopy-energy dispersive X-ray analysis).

In the presently disclosed functional layer-equipped separator for an electrochemical device, the surface of the functional layer for an electrochemical device preferably has a maximum height Rz of 1.6 μm or more. When the maximum height Rz of the surface of the functional layer for an electrochemical device is not less than the specific value set forth above in this manner, process adhesiveness of the functional layer can be further increased.

Note that the "maximum height Rz" of the "surface" referred to in the present specification is a value in accordance with JIS B 0601.

In the presently disclosed functional layer-equipped separator for an electrochemical device, the surface of the functional layer for an electrochemical device preferably has an arithmetic mean height Sa of 0.2 μm or more. When the arithmetic mean height Sa of the surface of the functional layer for an electrochemical device is not less than the specific value set forth above in this manner, process adhesiveness of the functional layer can be further increased.

Note that the "arithmetic mean height Sa" referred to in the present specification is a value in accordance with ISO 25178.

In the presently disclosed functional layer-equipped separator for an electrochemical device, a volume ratio of the inorganic particles and the particulate polymer in the functional layer for an electrochemical device, expressed as inorganic particles/particulate polymer, is preferably not less than 1.1 and not more than 2.1. When the volume ratio of the inorganic particles and the particulate polymer in the functional layer for an electrochemical device is within the specific range set forth above in this manner, a better balance of process adhesiveness and heat resistance is obtained in the functional layer.

In the presently disclosed functional layer-equipped separator for an electrochemical device, the particulate polymer preferably has a degree of swelling in electrolyte solution of not less than a factor of 1 and not more than a factor of 15. When the degree of swelling in electrolyte solution of the particulate polymer is within the specific range set forth above in this manner, adhesiveness of the functional layer in electrolyte solution can be increased, and electrochemical characteristics of an electrochemical device that includes the functional layer can be improved.

In the presently disclosed functional layer-equipped separator for an electrochemical device, the particulate polymer preferably satisfies 1) or 2):

1) the particulate polymer has a glass-transition temperature of not lower than 15° C. and not higher than 90° C.;
2) the particulate polymer has a melting point of 50° C. or higher.

When the glass-transition temperature of the particulate polymer is within the specific range set forth above in this manner, good adhesiveness of the functional layer can be ensured while also inhibiting blocking of the functional layer. Moreover, when the melting point of the particulate polymer is 50° C. or higher, good adhesiveness of the functional layer can be ensured even in a case in which the particulate polymer includes a crystalline macromolecule polymer.

Note that the "glass-transition temperature" and "melting point" referred to in the present disclosure can be measured by methods described in the EXAMPLES section of the present specification.

In the presently disclosed functional layer-equipped separator for an electrochemical device, the particulate polymer preferably includes an epoxy group-containing unsaturated monomer unit. When the particulate polymer includes an epoxy group-containing unsaturated monomer unit in this manner, adhesiveness of the functional layer in electrolyte solution can be increased, and preservation characteristics of an electrochemical device that includes the functional layer can be improved.

In the presently disclosed functional layer-equipped separator for an electrochemical device, proportional content of the epoxy group-containing unsaturated monomer unit in the particulate polymer is preferably not less than 0.5 mass % and not more than 30.0 mass %. When the proportional content of the epoxy group-containing monomer unit in the particulate polymer is not less than the specific value set forth above in this manner, adhesiveness of the functional layer in electrolyte solution can be increased, and preservation characteristics of an electrochemical device that includes the functional layer can be improved. Moreover, when the proportional content of the epoxy group-containing monomer unit in the particulate polymer is not more than the specific value set forth above, the particulate polymer can be stably produced.

Furthermore, the present disclosure aims to advantageously solve the problems set forth above, and a presently disclosed electrochemical device comprises the functional layer-equipped separator for an electrochemical device set forth above. Through inclusion of the presently disclosed functional layer-equipped separator for an electrochemical device in this manner, it is possible to provide an electrochemical device that can display excellent electrochemical characteristics.

Advantageous Effect

According to the present disclosure, it is possible to provide a functional layer-equipped separator for an electrochemical device including a functional layer that has excellent process adhesiveness and heat resistance and that enables good electrolyte solution injectability.

Moreover, according to the present disclosure, it is possible to provide an electrochemical device that can display excellent electrochemical characteristics.

DETAILED DESCRIPTION

Figure 1:
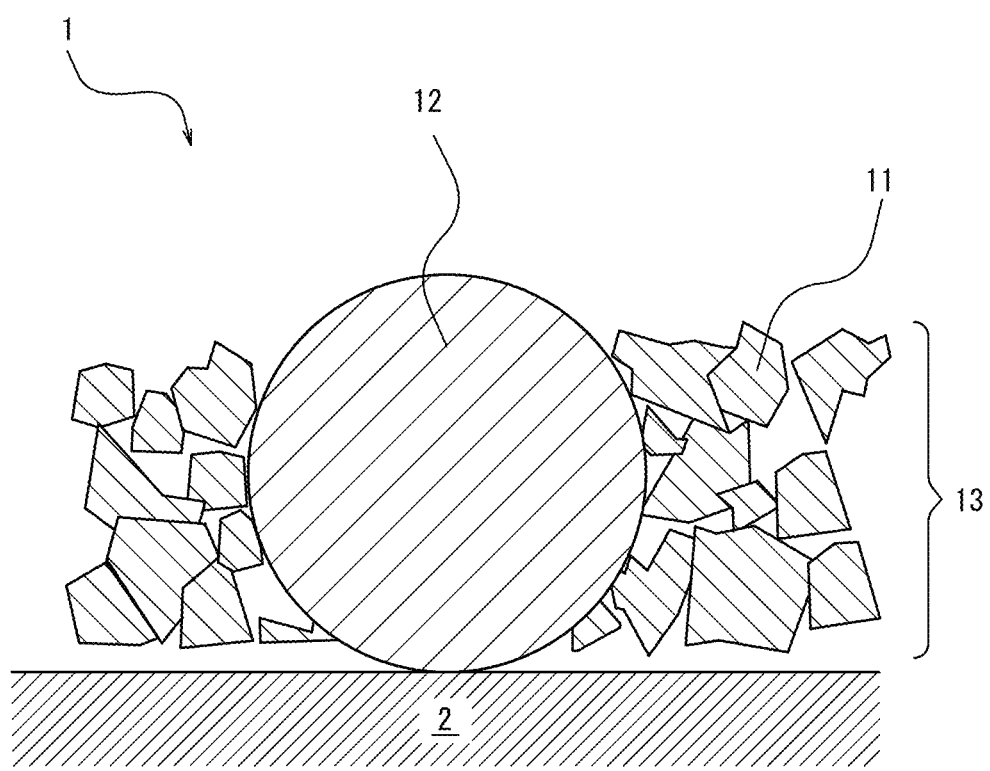
FIG. 1 is a schematic cross-sectional view illustrating one example of a functional layer-equipped separator for an electrochemical device according to the present disclosure.

The following provides a detailed description of embodiments of the present disclosure.

The presently disclosed functional layer-equipped separator for an electrochemical device can be used in production of the presently disclosed electrochemical device. Moreover, the presently disclosed electrochemical device is an electrochemical device that includes at least the presently disclosed functional layer-equipped separator for an electrochemical device.

(Functional Layer-Equipped Separator for Electrochemical Device)

The presently disclosed functional layer-equipped separator for an electrochemical device (hereinafter, also referred to simply as a "functional layer-equipped separator") includes a separator substrate and a specific functional layer for an electrochemical device that is disposed on at least one surface of the separator substrate. According to the present disclosure, it is possible to provide a functional layer-equipped separator for an electrochemical device including a functional layer that has excellent process adhesiveness and heat resistance and that enables good electrolyte solution injectability.

<Separator Substrate>

The separator substrate is not specifically limited and can be any of those described in JP2012-204303A, for example. Of such separator substrates, a microporous membrane formed of a polyolefinic resin (polyethylene, polypropylene, polybutene, or polyvinyl chloride) is preferable from a viewpoint that the overall thickness of the functional layer-equipped separator can be reduced, which makes it possible to increase the ratio of electrode active material in a lithium ion secondary battery and increase the volumetric capacity of the lithium ion secondary battery.

<Functional Layer for Electrochemical Device>

The functional layer for an electrochemical device (hereinafter, also referred to simply as a "functional layer") that is included in the presently disclosed functional layer-equipped separator contains inorganic particles and a particulate polymer, and can optionally further contain other components. Moreover, the functional layer for an electrochemical device included in the presently disclosed functional layer-equipped separator has a surface having a maximum height Sz that is not less than a specific value and includes one or more protrusions that each contain the particulate polymer at a surface thereof. The functional layer included in the presently disclosed functional layer-equipped separator has excellent process adhesiveness and heat resistance, and enables good electrolyte solution injectability.

<<Properties of Functional Layer>>

{Maximum Height Sz}

The maximum height Sz of the surface of the functional layer is required to be 2.5 μm or more, is preferably 5.0 μm or more, and more preferably 7.5 μm or more, and is preferably 15.0 μm or less, and more preferably 10.0 μm or less. When the maximum height Sz of the surface of the functional layer is not less than any of the lower limits set forth above, the functional layer can display excellent process adhesiveness. On the other hand, when the maximum height Sz of the surface of the functional layer is not more than any of the upper limits set forth above, process adhesiveness of the functional layer can be further increased.

{Maximum Height Rz}

The maximum height Rz of the surface of the functional layer is preferably 1.6 μm or more, and is preferably 2.5 μm or less, and more preferably 2.0 μm or less. When the maximum height Rz of the surface of the functional layer is within any of the specific ranges set forth above, process adhesiveness of the functional layer can be further increased.

{Arithmetic Mean Height Sa}

The arithmetic mean height Sa of the surface of the functional layer is preferably 0.2 μm or more, and more preferably 0.4 μm or more, and is preferably 1.0 μm or less, and more preferably 0.8 μm or less. When the arithmetic mean height Sa of the surface of the functional layer is within any of the specific ranges set forth above, process adhesiveness of the functional layer can be further increased.

{Protrusions Containing Particulate Polymer at Surface}

The functional layer includes one or more protrusions each containing the particulate polymer at a surface thereof. Note that a detailed description of the particulate polymer is provided further below.

The area proportion occupied by the particulate polymer at the protrusion surface is preferably 10% or more, more preferably 50% or more, and particularly preferably 100%. When the area proportion occupied by the particulate polymer at the protrusion surface is not less than any of the specific values set forth above, process adhesiveness of the functional layer can be further increased. Note that the area proportion occupied by the particulate polymer at the protrusion surface can be measured by measuring the separator surface by SEM-EDX and performing element mapping of C, Al, or the like.

In plan view of the surface of the functional layer, the proportion of area occupied by the protrusions each containing the particulate polymer at the surface thereof (protrusion-occupied area) per unit area of the surface of the functional layer is preferably 10% or less, more preferably 8% or less, and even more preferably 6% or less, and is preferably 1% or more, more preferably 2% or more, and even more preferably 3% or more. When the proportion of protrusion-occupied area is not less than any of the lower limits set forth above, process adhesiveness of the functional layer can be further increased. On the other hand, when the proportion of protrusion-occupied area is not more than any of the upper limits set forth above, injectability can be further increased. The proportion of protrusion-occupied area can be measured by using a laser displacement sensor microscope (produced by Keyence Corporation; model: VK-X1000) to calculate the area of locations protruding 1 μm or more from the plane of arithmetic mean height Sa, which is taken as a reference.

The following provides a more detailed description of the protrusions mentioned above with drawings that illustrate specific examples of functional layer-equipped separators according to the present disclosure.

FIG. 1 is a schematic cross-sectional view illustrating one example of a functional layer-equipped separator according to the present disclosure. As illustrated in FIG. 1, a functional layer 1 is formed on a separator substrate 2 and contains inorganic particles 11 and a particulate polymer 12. A plurality of inorganic particles 11 overlap with one another in a thickness direction of the functional layer 1 to thereby form an inorganic particle layer 13. The particulate polymer 12 is embedded in the inorganic particle layer 13, and part of the particulate polymer protrudes from the surface of the inorganic particle layer 13 (functional layer 1) to form a protrusion.

Figure 2:
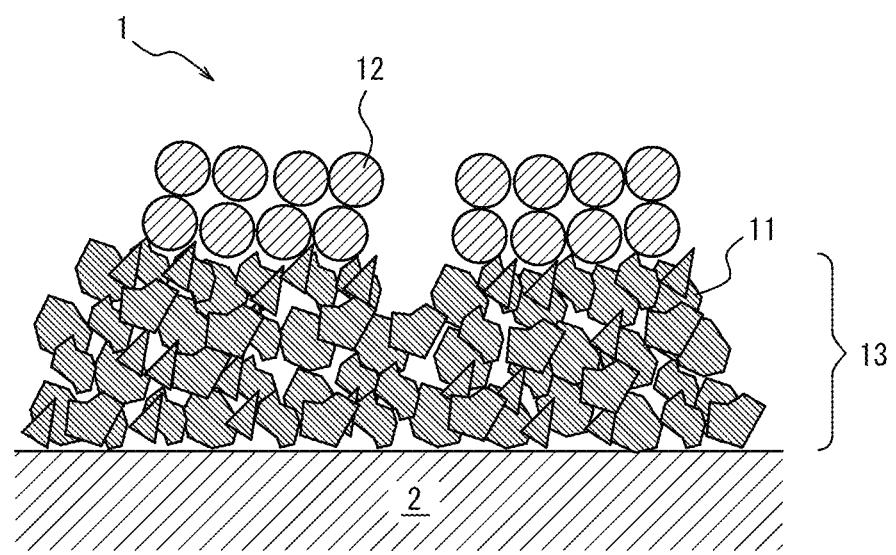
FIG. 2 is a schematic cross-sectional view illustrating another example of a functional layer-equipped separator for an electrochemical device according to the present disclosure.

FIG. 2 is a schematic cross-sectional view illustrating another example of a functional layer-equipped separator according to the present disclosure. As illustrated in FIG. 2, a functional layer 1 is formed on a separator substrate 2 and contains inorganic particles 11 and a particulate polymer 12. A plurality of inorganic particles 11 overlap with one another in the thickness direction of the functional layer 1 to thereby form an inorganic particle layer 13. Note that the inorganic particle layer 13 is formed over the entire surface of the separator substrate 2. Protrusions that each comprise a plurality of particles of the particulate polymer 12 are formed on the surface of the inorganic particle layer 13. Although not illustrated in the drawings, in plan view of the functional layer 1, the protrusions may have a dotted shape, line shape (stripe), circular shape (crater rim shape), or the like, for example, without any specific limitations.

Figure 3:
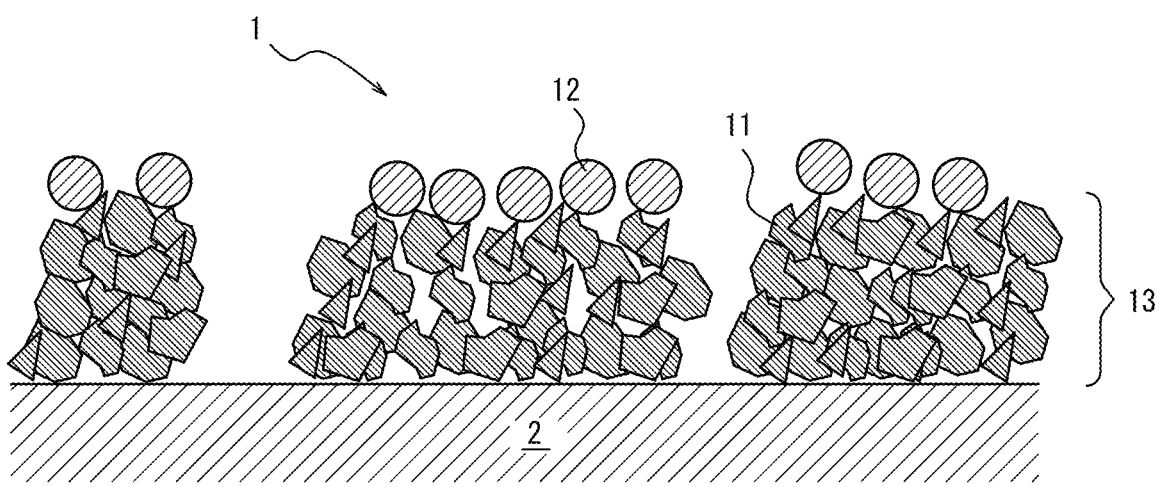
FIG. 3 is a schematic cross-sectional view illustrating yet another example of a functional layer-equipped separator for an electrochemical device according to the present disclosure.

FIG. 3 is a schematic cross-sectional view illustrating yet another example of a functional layer-equipped separator according to the present disclosure. As illustrated in FIG. 3, a functional layer 1 is formed on a separator substrate 2 and contains inorganic particles 11 and a particulate polymer 12. A plurality of inorganic particles 11 overlap with one another in the thickness direction of the functional layer 1 to thereby form an inorganic particle layer 13. The inorganic particle layer 13 is not formed over the entire surface of the separator substrate 2 and is only formed on part of the separator substrate 2. In other words, part of the separator substrate 2 is not covered by the inorganic particle layer 13 and is thus exposed. Although not illustrated in the drawings, in plan view of the functional layer 1, the inorganic particle layer 13 may have a dotted shape, line shape (stripe), circular shape (crater rim shape), or the like, for example, without any specific limitations. In addition, assemblies each comprising a plurality of particles of the particulate polymer 12 are disposed such as to at least partially cover the surface of the inorganic particle layer 13. As a result, the inorganic particle layer 13 and the particulate polymer 12 that at least partially covers the inorganic particle layer 13 are joined to thereby form protrusions. Note that in plan view of the functional layer 1, each of the assemblies comprising a plurality of particles of the particulate polymer 12 may have a dotted shape, line shape (stripe), circular shape (crater rim shape), or the like, for example, without any specific limitations. Moreover, in plan view of the functional layer 1, the shape of the assemblies each comprising a plurality of particles of the particulate polymer 12 may match the shape of the inorganic particle layer 13 or may differ from the shape of the inorganic particle layer 13.

In each of the cases illustrated in FIGS. 1 to 3, the thickness of the inorganic particle layer 13 is preferably 0.5 μm or more, more preferably 0.8 μm or more, and even more preferably 1 μm or more, and is preferably 6 μm or less, more preferably 5 μm or less, and even more preferably 4 μm or less. When the thickness of the inorganic particle layer 13 is not less than any of the lower limits set forth above, heat resistance of the functional layer can be improved. On the other hand, when the thickness of the inorganic particle layer 13 is not more than any of the upper limits set forth above, reduction of energy density of an electrochemical device that includes the functional layer can be inhibited. Moreover, the functional layer can be provided with better adhesiveness.

<<Inorganic Particles>>

The inorganic particles contained in the functional layer are used in order to increase heat resistance of the functional layer. In general, a plurality of inorganic particles overlap with one another in a thickness direction of the functional layer so as to form an inorganic particle layer in the functional layer. Note that in the functional layer, the inorganic particle layer and the particulate polymer described in detail further below may overlap with each other in the thickness direction of the functional layer or may not overlap with each other in the thickness direction of the functional layer.

{Inorganic Particle-Occupied Area}

Figure 4:
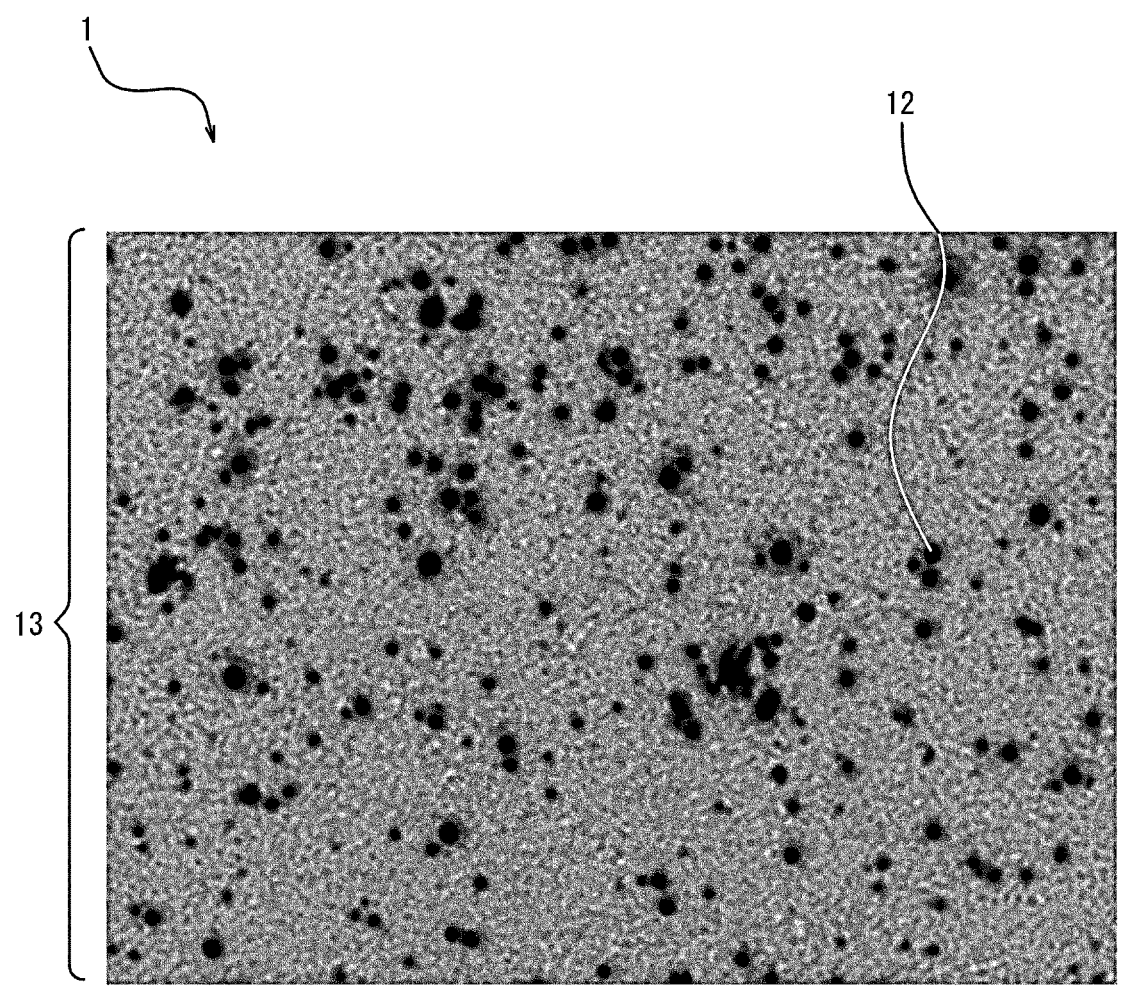
FIG. 4 is a schematic plan view illustrating one example of configuration of a functional layer included in a functional layer-equipped separator for an electrochemical device according to the present disclosure in plan view of the surface of the functional layer.

FIG. 4 is a schematic plan view illustrating one example of configuration of a functional layer for an electrochemical device according to the present disclosure in plan view of the surface of the functional layer for an electrochemical device. As illustrated in FIG. 4, the functional layer 1 includes a particulate polymer 12 and an inorganic particle layer 13.

In plan view of the surface of the functional layer, the proportion of area occupied by the inorganic particles (inorganic particle-occupied area) per unit area of the surface of the functional layer is preferably more than 90%, more preferably 92% or more, and even more preferably 93% or more, and is preferably 99% or less, more preferably 98% or less, and even more preferably 97% or less. When the proportion of inorganic particle-occupied area is more than 90%, the functional layer can be provided with excellent heat resistance. Moreover, electrochemical characteristics (particularly output characteristics) and electrolyte solution injectability of an electrochemical device that includes the functional layer can be improved. On the other hand, when the proportion of inorganic particle-occupied area is not more than any of the upper limits set forth above, excellent adhesiveness can be imparted to the functional layer.

{Volume-Average Particle Diameter of Inorganic Particles}

The volume-average particle diameter (D50) of the inorganic particles is preferably 0.1 μm or more, more preferably 0.2 μm or more, and even more preferably 0.3 μm or more, and is preferably 1 μm or less, more preferably 0.9 μm or less, and even more preferably 0.8 μm or less. When the volume-average particle diameter of the inorganic particles is not less than any of the lower limits set forth above, the inorganic particles are densely packed in the functional layer. This makes it possible to inhibit reduction of ion conductivity in the functional layer and further improve electrochemical characteristics (particularly output characteristics) of an electrochemical device. Moreover, when the volume-average particle diameter of the inorganic particles is not more than any of the upper limits set forth above, the functional layer can be caused to display excellent heat resistance even in a case in which the inorganic particle layer is thin, which makes it possible to increase the capacity of an electrochemical device.

{Material of Inorganic Particles}

The material of the inorganic particles is preferably an electrochemically stable material that is stably present in the environment of use of an electrochemical device. Examples of materials that are preferable for the inorganic particles from such viewpoints include particles of oxides such as aluminum oxide (alumina), hydrous aluminum oxide (boehmite (AlOOH)), gibbsite (Al(OH)$_3$), silicon oxide, magnesium oxide (magnesia), magnesium hydroxide, calcium oxide, titanium oxide (titania), barium titanate (BaTiO$_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. Of these materials, aluminum oxide, boehmite, titanium oxide, and barium sulfate are preferable, and aluminum oxide is more preferable. These inorganic particles may be subjected to element substitution, surface treatment, solid solution treatment, or the like as necessary.

One of these types of inorganic particles may be used individually, or two or more of these types of inorganic particles may be used in combination in a freely selected ratio.

<<Particulate Polymer>>

The particulate polymer contained in the functional layer is not specifically limited so long as it enables formation, on the separator substrate, of a functional layer having a surface with a maximum height Sz of not less than a specific value and including one or more protrusions each containing the particulate polymer at the surface thereof.

{Mixing Ratio of Inorganic Particles and Particulate Polymer}

The volume ratio of the inorganic particles and the particulate polymer (inorganic particles/particulate polymer) in the functional layer is preferably 1.1 or more, and more preferably 1.4 or more, and is preferably 2.1 or less, and more preferably 1.6 or less. When the volume ratio of the inorganic particles and the particulate polymer is within any of the specific ranges set forth above, the functional layer has a better balance of heat resistance and adhesiveness.

The mass ratio of the inorganic particles and the particulate polymer (inorganic particles/particulate polymer) in the functional layer is preferably 55/45 or more, more preferably 60/40 or more, and even more preferably 65/35 or more, and is preferably 95/5 or less, more preferably 93/7 or less, and even more preferably 90/10 or less. When the mixing ratio of the inorganic particles and the particulate polymer as a mass ratio is within any of the specific ranges set forth above, the functional layer has an even better balance of heat resistance and adhesiveness.

Note that the particulate polymer contained in the functional layer may be one type of particulate polymer used individually or may be a mixture of a plurality of types of particulate polymers in a freely selected ratio. In a case in which a plurality of types of particulate polymers are used, the "particulate polymer" in the volume ratio and mass ratio of the inorganic particles and the particulate polymer described above is the total amount of the plurality of types of particulate polymers.

{Specific Example of Particulate Polymer}

The following provides a detailed description of a particulate polymer (X) having a larger volume-average particle diameter than the thickness of the inorganic particle layer and a particulate polymer (Y) having a smaller volume-average particle diameter than the thickness of the inorganic particle layer as examples of particulate polymers that can suitably be contained in the functional layer in a case in which the functional layer of the presently disclosed functional layer-equipped separator has the configuration illustrated in FIG. 1, described above.

{{Particulate Polymer (X)}}

The particulate polymer (X) that can suitably be contained in the functional layer of the presently disclosed functional layer-equipped separator has a larger volume-average particle diameter than the thickness of the previously described inorganic particle layer. The particulate polymer (X) is a component that can display good adhesiveness when the functional layer-equipped separator is adhered to another member (electrode, etc.) via the functional layer. Note that the particulate polymer (X) may have a particulate form or may have any other form after members have been adhered via the functional layer. Moreover, the particulate polymer (X) may be a crystalline macromolecule polymer, an amorphous macromolecule polymer, or a mixture thereof.

—Volume-Average Particle Diameter of Particulate Polymer (X)—

The volume-average particle diameter of the particulate polymer (X) is preferably 1.0 µm or more, more preferably 2.5 µm or more, even more preferably 5.0 µm or more, and particularly preferably more than 5.0 µm, and is preferably 10.0 µm or less, more preferably 9.0 µm or less, and even more preferably 8.0 µm or less. When the volume-average particle diameter of the particulate polymer (X) is not less than any of the lower limits set forth above, even better adhesiveness can be obtained because the particulate polymer (X) can easily protrude relative to the inorganic particles at a thickness direction surface of the functional layer. In addition, heat resistance of the functional layer improves. Furthermore, in a situation in which a member including the functional layer and another member are adhered, this ensures that there is a gap between the inorganic particle layer and the other member in the thickness direction of the functional layer. Better electrolyte solution injectability can thus be obtained because electrolyte solution can be injected from this gap. Although it is not clear why heat resistance of the functional layer improves as described above, the reason for this is presumed to be as follows. In order to increase heat resistance, it is necessary for the inorganic particles to constitute a high proportion in the functional layer. It is thought that as a result of the particulate polymer (X) protruding relative to the inorganic particles at a thickness direction surface of the functional layer, the proportion constituted by the inorganic particles in the inorganic particle layer appears to be higher, and thus heat resistance increases. Moreover, when the volume-average particle diameter of the particulate polymer (X) is not more than any of the upper limits set forth above, good adhesiveness of the functional layer can be obtained while also improving blocking resistance of the functional layer.

The volume-average particle diameter of the particulate polymer (X) can be adjusted through the type and/or amount of a metal hydroxide used in production of the particulate polymer (X). This metal hydroxide is described in detail further below.

Note that the "volume-average particle diameter" can be measured by a method described in the EXAMPLES section of the present specification.

—Ratio of Volume-Average Particle Diameter of Particulate Polymer (X) Relative to Thickness of Inorganic Particle Layer—

The ratio of the volume-average particle diameter of the particulate polymer (X) relative to the thickness of the inorganic particle layer (volume-average particle diameter of particulate polymer (X)/thickness of inorganic particle layer) is preferably 1.1 or more, more preferably 1.2 or more, even more preferably 1.3 or more, further preferably 1.5 or more, and even further preferably 3.0 or more, and is preferably 10.0 or less, more preferably 5.0 or less, even more preferably 4.5 or less, and further preferably 4.0 or less. When the ratio of the volume-average particle diameter of the particulate polymer (X) relative to the thickness of the inorganic particle layer is not less than any of the lower limits set forth above, even better adhesiveness can be displayed because the particulate polymer (X) protrudes even more easily relative to the surface of the inorganic particles at a thickness direction surface of the inorganic particle layer. Moreover, when the ratio of the volume-average particle diameter of the particulate polymer (X) relative to the thickness of the inorganic particle layer is not less than any of the lower limits set forth above, the particulate polymer (X) is more stably held in the functional layer, and thus detachment from the functional layer of components (particulate polymer (X), etc.) of the functional layer (i.e., dusting) can be further inhibited, and a more uniform functional layer can be maintained.

—Mixing Ratio of Inorganic Particles and Particulate Polymer (X)—

The volume ratio of the inorganic particles and the particulate polymer (X) (inorganic particles/particulate polymer) in the functional layer is preferably 55/45 or more, more preferably 60/40 or more, and even more preferably 65/35 or more, and is preferably 95/5 or less, more preferably 80/20 or less, even more preferably 75/25 or less, and particularly preferably 70/30 or less. When the volume ratio of the inorganic particles and the particulate polymer (X) is within any of the specific ranges set forth above, the functional layer has a better balance of heat resistance and adhesiveness.

The mass ratio of the inorganic particles and the particulate polymer (X) (inorganic particles/particulate polymer) in the functional layer is preferably 49/51 or more, more preferably 58/42 or more, and even more preferably 64/36 or more, and is preferably 99/1 or less, more preferably 94/6 or less, and even more preferably 91/9 or less. When the mass ratio of the inorganic particles and the particulate polymer (X) is within any of the specific ranges set forth above, the functional layer has an even better balance of heat resistance and adhesiveness.

—Glass-Transition Temperature of Particulate Polymer (X)—

The glass-transition temperature (Tg) of the particulate polymer (X) is preferably 15° C. or higher, more preferably 20° C. or higher, even more preferably 30° C. or higher, and particularly preferably 40° C. or higher, and is preferably 90° C. or lower, and more preferably 80° C. or lower. When the glass-transition temperature of the particulate polymer (X) is not lower than any of the lower limits set forth above, the occurrence of blocking of the functional layer can be inhibited during storage or the like of an electrochemical device that includes the functional layer, for example. On the other hand, when the glass-transition temperature of the particulate polymer (X) is not higher than any of the upper limits set forth above, good adhesiveness of the functional layer can be obtained even when members are pressed and adhered via the functional layer.

Note that the "glass-transition temperature" can be measured by a method described in the EXAMPLES section of the present specification.

—Melting Point of Particulate Polymer (X)—

The melting point (Tm) of the particulate polymer (X) is preferably 50° C. or higher, and more preferably 100° C. or higher. When the melting point of the particulate polymer (X) is not lower than any of the lower limits set forth above, good adhesiveness of the functional layer can be ensured even in a case in which the particulate polymer (X) includes a crystalline macromolecule polymer.

Note that in a case in which the particulate polymer (X) has both a glass-transition temperature and a melting point, the melting point of the particulate polymer (X) is preferably not lower than any of the lower limits set forth above from a viewpoint of further improving adhesiveness of the functional layer.

Note that the "melting point" can be measured by a method described in the EXAMPLES section of the present specification.

—Degree of Swelling in Electrolyte Solution of Particulate Polymer (X)—

The degree of swelling in electrolyte solution of the particulate polymer (X) is preferably a factor of 1.0 or more, more preferably a factor of 1.2 or more, and even more preferably a factor of 1.3 or more, and is preferably a factor of 15 or less, more preferably a factor of 10 or less, and even more preferably a factor of 7 or less. When the degree of swelling in electrolyte solution of the particulate polymer (X) is not less than any of the lower limits set forth above, the functional layer can be provided with strong adhesive strength in electrolyte solution. On the other hand, when the degree of swelling in electrolyte solution of the particulate polymer (X) is not more than any of the upper limits set forth above, electrochemical characteristics of an electrochemical device that includes the functional layer can be improved because resistance of the functional layer in electrolyte solution decreases.

Note that the "degree of swelling in electrolyte solution" can be measured by a method described in the EXAMPLES section of the present specification.

—Chemical Composition of Particulate Polymer (X)—

No specific limitations are placed on the chemical composition of the particulate polymer (X) so long as the volume-average particle diameter of the particulate polymer (X) is larger than the thickness of the inorganic particle layer as previously described. Accordingly, a known polymer that can be used as a binder in formation of a functional layer, for example, can be used as the particulate polymer (X).

Examples of monomer units that may be included in the particulate polymer (X) include an aromatic vinyl monomer unit, a (meth)acrylic acid ester monomer unit, a fluorine-containing monomer unit, a cross-linkable monomer unit, and so forth. Note that in the present disclosure, "(meth) acryl" is used to indicate "acryl" and/or "methacryl".

The phrase "includes a monomer unit" as used in relation to a polymer in the present disclosure means that a polymer obtained with the monomer includes a repeating unit derived from the monomer.

——Aromatic Vinyl Monomer Unit——

Examples of aromatic vinyl monomers that can form an aromatic vinyl monomer unit include, but are not specifically limited to, styrene, α-methylstyrene, styrene sulfonic acid, butoxystyrene, and vinylnaphthalene, of which, styrene is preferable.

One of these aromatic vinyl monomers may be used individually, or two or more of these aromatic vinyl monomers may be used in combination in a freely selected ratio.

The proportional content of an aromatic vinyl monomer unit in the particulate polymer (X) when all monomer units in the particulate polymer are taken to be 100 mass % is preferably 30 mass % or more, and more preferably 50 mass % or more, and is preferably 95 mass % or less, more preferably 90 mass % or less, even more preferably 80 mass % or less, and further preferably 70 mass % or less. When the proportional content of an aromatic vinyl monomer unit is not less than any of the lower limits set forth above, elasticity of the particulate polymer (X) improves, strength of the obtained functional layer is ensured, and close adherence of the functional layer and a substrate can be increased. On the other hand, when the proportional content of an aromatic vinyl monomer unit is not more than any of the upper limits set forth above, flexibility of the particulate polymer (X) increases, and thus close adherence of the functional layer and a substrate can be increased.

Note that the "proportional content" of each "monomer unit" referred to the present disclosure can be measured by a nuclear magnetic resonance (NMR) method such as $^1$H-NMR.

——(Meth)Acrylic Acid Ester Monomer Unit——

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate. Of these (meth)acrylic acid ester monomers, n-butyl acrylate, 2-ethylhexyl acrylate, and methyl methacrylate are preferable, and n-butyl acrylate is more preferable.

One of these (meth)acrylic acid ester monomers may be used individually, or two or more of these (meth)acrylic acid ester monomers may be used in combination in a freely selected ratio.

The proportional content of a (meth)acrylic acid ester monomer unit in the particulate polymer (X) when all repeating units of the particulate polymer are taken to be 100 mass % is preferably 10 mass % or more, and is preferably 80 mass % or less, and more preferably 75 mass % or less. When the proportional content of a (meth)acrylic acid ester monomer unit is not less than the lower limit set forth above, excessive lowering of the glass-transition temperature of the particulate polymer (X) can be avoided, and blocking resistance of the obtained functional layer can be improved. On the other hand, when the proportional content of a (meth) acrylic acid ester monomer unit is not more than any of the upper limits set forth above, good close adherence of the functional layer and a substrate can be achieved.

——Fluorine-Containing Monomer Unit——

Examples of fluorine-containing monomers that can form a fluorine-containing monomer unit include, but are not specifically limited to, vinylidene fluoride, tetrafluoroethylene, hexafluoropropylene, chlorotrifluoroethylene, vinyl fluoride, and perfluoroalkyl vinyl ethers. Of these fluorine-containing monomers, vinylidene fluoride is preferable.

One of these fluorine-containing monomers may be used individually, or two or more of these fluorine-containing monomers may be used in combination in a freely selected ratio.

In a case in which the particulate polymer (X) includes a fluorine-containing monomer unit, the particulate polymer (X) is preferably a fluorine-containing polymer obtained using vinylidene fluoride as a fluorine-containing monomer from a viewpoint that better adhesiveness of the functional layer can be ensured. In particular, the fluorine-containing polymer is preferably a homopolymer of vinylidene fluoride, a copolymer of vinylidene fluoride and another fluorine-containing monomer that is copolymerizable with vinylidene fluoride, or a copolymer of vinylidene fluoride, another fluorine-containing monomer that is copolymerizable with vinylidene fluoride, and a monomer that is copolymerizable with these fluorine-containing monomers. Of fluorine-containing polymers, polyvinylidene fluoride (PVdF), polytetrafluoroethylene (PTFE), vinylidene fluoride-hexafluoropropylene copolymer (PVdF-HFP), polyvinyl fluoride, and tetrafluoroethylene-perfluoroalkyl vinyl ether copolymer are preferable.

——Cross-Linkable Monomer Unit——

The particulate polymer (X) may further include a cross-linkable monomer unit in addition to the monomer units described above. A cross-linkable monomer unit is a monomer unit that can form a cross-linked structure, either during or after polymerization, upon being heated or irradiated with an energy beam.

Although the particulate polymer (X) may include either of an epoxy group-containing unsaturated monomer unit and a cross-linkable monomer unit other than an epoxy group-containing unsaturated monomer unit as a cross-linkable monomer unit, it is preferable that the particulate polymer (X) includes at least an epoxy group-containing unsaturated monomer unit from a viewpoint of increasing adhesiveness of the functional layer in electrolyte solution and providing an electrochemical device with good preservation characteristics.

=Epoxy Group-Containing Unsaturated Monomer Unit=

Examples of epoxy group-containing unsaturated monomers that can form an epoxy group-containing unsaturated monomer unit include unsaturated glycidyl ethers such as vinyl glycidyl ether, allyl glycidyl ether, butenyl glycidyl ether, o-allylphenyl glycidyl ether, and glycidyl(2-butenyl) ether; monoepoxides of dienes and polyenes such as butadiene monoepoxide, chloroprene monoepoxide, 4,5-epoxy-2-pentene, 3,4-epoxy-1-vinylcyclohexane, and 1,2-epoxy-5, 9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Of these examples, it is preferable to use an unsaturated glycidyl ether or a glycidyl ester of an unsaturated carboxylic acid from a viewpoint of further increasing adhesiveness of the functional layer in electrolyte solution and providing an electrochemical device with even better preservation characteristics, and it is more preferable to use allyl glycidyl ether, glycidyl(2-butenyl) ether, or glycidyl methacrylate.

One of these epoxy group-containing unsaturated monomers may be used individually, or two or more of these epoxy group-containing unsaturated monomers may be used in combination in a freely selected ratio.

The proportional content of an epoxy group-containing unsaturated monomer unit in the particulate polymer (X) when the amount of all monomer units of the particulate polymer (X) is taken to be 100 mass % is preferably 0.5 mass % or more, more preferably 2.0 mass % or more, and even more preferably 10.0 mass % or more, and is preferably 30.0 mass % or less, more preferably 25.0 mass % or less, and even more preferably 20.0 mass % or less. When the proportional content of an epoxy group-containing unsaturated monomer unit in the particulate polymer (X) is not less than any of the lower limits set forth above, adhesiveness of the functional layer in electrolyte solution can be further increased, and an electrochemical device can be provided with even better preservation characteristics. On the other hand, when the proportional content of an epoxy group-containing unsaturated monomer unit is not more than any of the upper limits set forth above, the particulate polymer (X) can be stably produced.

=Cross-Linkable Monomer Unit Other than Epoxy Group-Containing Unsaturated Monomer Unit=

Examples of monomers that can form a cross-linkable monomer unit other than an epoxy group-containing unsaturated monomer unit include polyfunctional monomers that include at least two groups displaying polymerization reactivity in the monomer. Examples of such polyfunctional monomers include divinyl compounds such as divinylbenzene; di(meth)acrylic acid ester compounds such as diethylene glycol dimethacrylate, ethylene glycol dimethacrylate, diethylene glycol diacrylate, and 1,3-butylene glycol diacrylate; and tri(meth)acrylic acid ester compounds such as trimethylolpropane trimethacrylate and trimethylolpropane triacrylate. Of these polyfunctional monomers, ethylene glycol dimethacrylate is preferable.

One of these cross-linkable monomers may be used individually, or two or more of these cross-linkable monomers may be used in combination in a freely selected ratio.

The proportional content of a cross-linkable monomer unit other than an epoxy group-containing unsaturated monomer unit in the particulate polymer (X) when the amount of all monomer units of the particulate polymer (X) is taken to be 100 mass % is preferably 0.02 mass % or more, and is preferably 2 mass % or less, more preferably 1.5 mass % or less, and even more preferably 1 mass % or less. When the proportional content of a cross-linkable monomer unit in the particulate polymer (X) is within any of the ranges set forth above, elution of the particulate polymer (X) into electrolyte solution can be sufficiently inhibited.

——Other Monomer Units——

The particulate polymer (X) may include other monomer units besides an aromatic vinyl monomer unit, a (meth)acrylic acid ester monomer unit, a fluorine-containing monomer unit, and a cross-linkable monomer unit.

Examples of such other monomer units include, but are not specifically limited to, a nitrile group-containing monomer unit and an acid group-containing monomer unit such as described further below in the "Particulate polymer (Y)" section.

=Nitrile Group-Containing Monomer Unit=

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile.

One of these nitrile group-containing monomers may be used individually, or two or more of these nitrile group-containing monomers may be used in combination in a freely selected ratio.

The proportional content of a nitrile group-containing monomer unit in the particulate polymer (X) when all repeating units in the particulate polymer (X) are taken to be 100 mass % is preferably 3 mass % or more, more preferably 4 mass % or more, and even more preferably 6 mass % or more, and is preferably 30 mass % or less, more preferably 27 mass % or less, and even more preferably 25 mass % or less. When the proportional content of a nitrile group-containing monomer unit is not less than any of the lower limits set forth above, binding strength of the particulate polymer (X) can be improved, and peel strength of the functional layer can be increased. On the other hand, when the proportional content of a nitrile group-containing monomer unit is not more than any of the upper limits set forth above, flexibility of the particulate polymer (X) can be increased.

The proportional content of other monomer units in the particulate polymer (X) is preferably 0 mass % or more, and is preferably 10 mass % or less, more preferably 7 mass % or less, and even more preferably 5 mass % or less. When the proportional content of other monomer units is 10 mass % or less, reduction of stability of a composition for a functional layer used to form the functional layer can be inhibited.

—Production of Particulate Polymer (X)—

The particulate polymer (X) can be produced through polymerization of a monomer composition that contains the monomers set forth above, carried out in an aqueous solvent such as water, for example. The proportion constituted by each monomer in the monomer composition is normally the same as the proportion constituted by each monomer unit in the particulate polymer (X).

The method of polymerization is not specifically limited and may, for example, be a method such as suspension polymerization, emulsion polymerization and aggregation, or pulverization. Of these methods, suspension polymerization or emulsion polymerization and aggregation is preferable from a viewpoint of efficiently producing the particulate polymer (X), and suspension polymerization is more preferable. The polymerization reaction may, for example, be a reaction such as radical polymerization or living radical polymerization.

Other compounding agents such as chain transfer agents, polymerization modifiers, polymerization reaction delaying agents, reactive fluidizers, fillers, flame retardants, antioxidants, and colorants can be compounded in any amounts in the monomer composition used in production of the particulate polymer (X).

The following describes a method of producing the particulate polymer (X) by suspension polymerization as one example.

——Production of Particulate Polymer (X) by Suspension Polymerization——

(1) Production of Monomer Composition

First, monomers that can form monomer units of the target particulate polymer (X) and other compounding agents that are added as necessary are mixed in order to produce a monomer composition.

(2) Formation of Droplets

Next, the monomer composition is dispersed in water, a polymerization initiator is added, and then droplets of the monomer composition are formed. No specific limitations are placed on the method by which the droplets are formed. For example, the droplets can be formed through shear stirring of an aqueous medium containing the monomer composition using a disperser such as an emulsifying/dispersing device.

The polymerization initiator that is used may be an oil-soluble polymerization initiator such as t-butyl peroxy-2-ethylhexanoate or azobisisobutyronitrile, for example. Note that the polymerization initiator may be added after dispersion of the monomer composition in water but before formation of droplets, or may be added to the monomer composition before dispersion thereof in water.

Formation of the droplets of the monomer composition is preferably performed after a dispersion stabilizer has been added to the water from a viewpoint of stabilizing droplets of the monomer composition formed in the water. The dispersion stabilizer may be a metal hydroxide such as magnesium hydroxide, or may be sodium dodecylbenzenesulfonate, or the like, for example.

(3) Polymerization

Once droplets of the monomer composition have been formed, the water containing the formed droplets is heated to initiate polymerization and thereby form the particulate polymer (X) in the water. The reaction temperature during polymerization is preferably not lower than 50° C. and not higher than 95° C. Moreover, the reaction time during polymerization is preferably not less than 1 hour and not more than 10 hours, and is preferably 8 hours or less, and more preferably 6 hours or less.

(4) Washing, Filtration, Dehydration, and Drying Steps

Once polymerization has ended, the water containing the particulate polymer (X) can be subjected to washing, filtration, and drying by standard methods to obtain the particulate polymer (X).

{{Particulate Polymer (Y)}}

In addition to the particulate polymer (X) described above, the functional layer may further contain a particulate polymer (Y) that functions as a binder and that has a smaller volume-average particle diameter than the thickness of the inorganic particle layer. The particulate polymer (Y) serving as a binder is a component that can inhibit detachment from the functional layer of components that are contained in the functional layer, such as the inorganic particles and the particulate polymer (X).

—Chemical Composition of Particulate Polymer (Y)—

No specific limitations are placed on the chemical composition of the particulate polymer (Y). For example, the particulate polymer (Y) may be a known polymer that is water-insoluble and can be dispersed in a dispersion medium such as water (for example, a binding resin such as a thermoplastic elastomer or polyvinylidene fluoride (PVDF)). The thermoplastic elastomer is preferably a conjugated diene polymer or an acrylic polymer, and is more preferably an acrylic polymer.

The term "conjugated diene polymer" refers to a polymer that includes a conjugated diene monomer unit. Specific examples of conjugated diene polymers include, but are not specifically limited to, copolymers including an aromatic vinyl monomer unit and an aliphatic conjugated diene monomer unit (for example, styrene-butadiene copolymer (SBR)), butadiene rubber (BR), acrylic rubber (NBR) (copolymer including an acrylonitrile unit and a butadiene unit), and hydrogenated products thereof.

The term "acrylic polymer" refers to a polymer that includes a (meth)acrylic acid ester monomer unit.

One of these particulate polymers (Y) may be used individually, or two or more of these particulate polymers (Y) may be used in combination in a freely selected ratio.

Examples of acrylic polymers that can preferably be used as the particulate polymer (Y) include, but are not specifically limited to, polymers that include a (meth)acrylic acid ester monomer unit and a cross-linkable monomer unit such as previously described and an acid group-containing monomer unit such as described below.

Examples of acid group-containing monomers that can form an acid group-containing monomer unit include carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Note that in the present specification, "(meth)allyl" is used to indicate "allyl" and/or "methallyl", whereas "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

One of these acid group-containing monomers may be used individually, or two or more of these acid group-containing monomers may be used in combination in a freely selected ratio.

The proportion constituted by a (meth)acrylic acid ester monomer unit in the acrylic polymer is preferably 50 mass % or more, more preferably 55 mass % or more, and even more preferably 58 mass % or more, and is preferably 98 mass % or less, more preferably 97 mass % or less, and even more preferably 96 mass % or less. When the proportion constituted by a (meth)acrylic acid ester monomer unit is not less than the lower limit of any of the ranges set forth above, peel strength of the functional layer can be further increased. Moreover, when this proportion is not more than any of the upper limits set forth above, electrochemical characteristics of an electrochemical device that includes the functional layer can be further enhanced.

The proportion constituted by a cross-linkable monomer unit in the acrylic polymer is preferably 0.1 mass % or more, and more preferably 1.0 mass % or more, and is preferably 3.0 mass % or less, and more preferably 2.5 mass % or less. When the proportion constituted by a cross-linkable monomer unit is not less than any of the lower limits set forth above, electrochemical characteristics of an electrochemical device that includes the functional layer can be further enhanced. Moreover, when the proportion constituted by a cross-linkable monomer unit is not more than any of the upper limits set forth above, peel strength of the functional layer can be even further increased.

The proportion constituted by an acid group-containing monomer unit in the acrylic polymer is preferably 0.1 mass % or more, more preferably 0.3 mass % or more, and even more preferably 0.5 mass % or more, and is preferably 20 mass % or less, more preferably 10 mass % or less, and even more preferably 5 mass % or less. When the proportion constituted by an acid group-containing monomer unit is not less than any of the lower limits set forth above, dispersibility of the particulate polymer (Y) in the functional layer can be increased, and electrochemical characteristics of an electrochemical device that includes the functional layer can be sufficiently enhanced. Moreover, when the proportion constituted by an acid group-containing monomer unit is not more than any of the upper limits set forth above, residual water content of the functional layer can be reduced, and electrochemical characteristics of an electrochemical device can be sufficiently enhanced.

The acrylic polymer may include other monomer units. Examples of other monomers that can form other monomer units that can be included in the acrylic polymer include aliphatic conjugated diene monomers such as 1,3-butadiene, 2-methyl-1,3-butadiene, 2,3-dimethyl-1,3-butadiene, and 2-chloro-1,3-butadiene; aromatic vinyl monomers and nitrile group-containing monomers described in the "Chemical composition of particulate polymer (X)" section; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocycle-containing vinyl compound monomers such as N-vinylpyrrolidone, vinylpyridine, and vinylimidazole. Of these other monomers, acrylonitrile is preferable.

One of these other monomers may be used individually, or two or more of these other monomers may be used in combination in a freely selected ratio. The proportional content of other monomer units in the acrylic polymer may be adjusted as appropriate.

—Glass-Transition Temperature of Particulate Polymer (Y)—

The glass-transition temperature (Tg) of the particulate polymer (Y) is preferably −100° C. or higher, more preferably −90° C. or higher, even more preferably −80° C. or higher, and further preferably −40° C. or higher, and is preferably lower than 30° C., more preferably 20° C. or lower, and even more preferably 15° C. or lower. When the glass-transition temperature of the particulate polymer (Y) is not lower than any of the lower limits set forth above, adhesiveness and strength of the particulate polymer (Y) can be increased. On the other hand, when the glass-transition temperature of the particulate polymer (Y) is lower than an upper limit set forth above or not higher than an upper limit set forth above, flexibility of the functional layer can be further increased.

—Volume-Average Particle Diameter of Particulate Polymer (Y)—

The volume-average particle diameter of the particulate polymer (Y) is not specifically limited so long as it is smaller than the volume-average particle diameter of the particulate polymer (X) and smaller than the thickness of the inorganic particle layer.

More specifically, the volume-average particle diameter of the particulate polymer (Y) is preferably 0.05 μm or more, and more preferably 0.10 μm or more, and is preferably 0.8 μm or less, and more preferably 0.5 μm or less. When the volume-average particle diameter of the particulate polymer (Y) is not less than any of the lower limits set forth above, clogging of the separator can be inhibited. On the other hand, when the volume-average particle diameter of the particulate polymer (Y) is not more than any of the upper limits set forth above, high adhesive strength can be achieved between particles forming the functional layer and between the functional layer and the separator substrate.

—Content of Particulate Polymer (Y)—

The content of the particulate polymer (Y) in the functional layer per 100 parts by mass of the inorganic particles is preferably 0.1 parts by mass or more, more preferably 0.2 parts by mass or more, and even more preferably 0.5 parts by mass or more, and is preferably 20 parts by mass or less, more preferably 15 parts by mass or less, and even more preferably 10 parts by mass or less. When the content of the particulate polymer (Y) is not less than any of the lower limits set forth above, detachment of components such as the particulate polymer (X) from the functional layer can be sufficiently prevented, and peel strength of the functional layer can be sufficiently increased. On the other hand, when the content of the particulate polymer (Y) is not more than any of the upper limits set forth above, reduction of ion conductivity of the functional layer can be inhibited, and deterioration of electrochemical characteristics of an electrochemical device can be inhibited.

—Production of Particulate Polymer (Y)—

The particulate polymer (Y) can be produced through polymerization of a monomer composition containing the monomers set forth above, carried out in an aqueous solvent such as water, for example, but is not specifically limited to being produced in this manner. The proportion constituted by each monomer in the monomer composition is normally the same as the proportion constituted by each monomer unit in the particulate polymer (Y).

The polymerization method and the polymerization reaction are not specifically limited, and any of the polymerization methods and polymerization reactions given as examples in relation to the polymerization method of the particulate polymer (X) described above can be used, for example.

<<Other Components>>

The functional layer may contain other components besides the inorganic particles and particulate polymer described above. Other components that can be contained in the functional layer are not specifically limited so long as they do not affect electrochemical reactions in an electrochemical device, and examples thereof include known additives such as dispersants, viscosity modifiers, and wetting agents. One of these other components may be used individually, or two or more of these other components may be used in combination.

Moreover, the functional layer may contain a binder other than the particulate polymer (Y) described above. No specific limitations are placed on such a binder so long as it does not correspond to the particulate polymer. For example, a water-soluble polymer such as polyvinyl alcohol can be used.

<<Formation Method of Functional Layer for Electrochemical Device>>

No specific limitations are placed on the method by which the functional layer is formed. For example, the functional layer can be formed using a composition for a functional layer that is obtained by mixing the above-described inorganic particles, particulate polymer, water serving as a dispersion medium, and other components that are used as necessary.

No specific limitations are placed on the method by which the composition for a functional layer is produced. For example, the composition for a functional layer can be produced by mixing the above-described particulate polymer, inorganic particles, water serving as a dispersion medium, and other components that are used as necessary. Note that in a case in which the particulate polymer is produced through polymerization of a monomer composition in water, the particulate polymer may be mixed with other components while still in the state of a water dispersion. Moreover, in a case in which the particulate polymer is mixed in the state of a water dispersion, water in the water dispersion may be used as the dispersion medium.

Although no specific limitations are placed on the mixing method of these components, the mixing is preferably performed using a disperser as a mixing device in order to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

The functional layer described above can be formed on a suitable substrate, for example. Examples of methods by which the functional layer may be formed on the substrate using the composition for a functional layer include, but are not specifically limited to:

(1) a method in which the composition for a functional layer is applied onto the surface of the substrate and is then dried;
(2) a method in which the substrate is immersed in the composition for a functional layer and is then dried; and
(3) a method in which the composition for a functional layer is applied onto a releasable substrate and is dried to form a functional layer that is then transferred onto the surface of the substrate.

Note that the functional layer may be formed on only one surface of the substrate or may be formed on both surfaces of the substrate.

Of these methods, method (1) is preferable in terms of ease of control of thickness of the functional layer. Method (1) may, for example, include a step of applying the composition for a functional layer onto the substrate (application step) and a step of drying the composition for a functional layer that has been applied onto the substrate to form the functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The composition for a functional layer on the substrate may be dried by any commonly known method in the functional layer formation step, without any specific limitations. For example, the drying method may be drying by warm, hot, or low-humidity air; drying in a vacuum; or drying by irradiation with infrared light, electron beams, or the like. Although no specific limitations are placed on the drying conditions, the drying temperature is preferably 50° C. to 150° C., and the drying time is preferably 1 minute to 30 minutes.

The functional layer formed on the substrate can suitably be used as a single layer that simultaneously displays the function of a heat-resistant layer that increases heat resistance of the substrate and the function of an adhesive layer that strongly adheres members together.

The substrate including the functional layer formed using the composition for a functional layer as described above (hereinafter, also referred to as a "functional layer-equipped substrate") is highly producible because it can be produced with shortened workload and time compared to a conventional substrate that includes a heat-resistant layer and an adhesive layer.

{Maximum Thickness of Functional Layer}

The maximum thickness of the functional layer formed by applying the composition for a functional layer onto the substrate is preferably 1.0 μm or more, more preferably 1.5 μm or more, even more preferably 2.0 μm or more, particularly preferably 2.5 μm or more, and most preferably 5.0 μm or more, and is preferably 10.0 μm or less, more preferably 9.0 μm or less, and even more preferably 8.0 μm or less. When the maximum thickness of the functional layer is not less than any of the lower limits set forth above, the functional layer has extremely good heat resistance. On the other hand, when the maximum thickness of the functional layer is not more than any of the upper limits set forth above, ion diffusivity of the functional layer can be ensured, and electrochemical characteristics (output characteristics) of an electrochemical device can be more sufficiently enhanced.

Note that the "maximum thickness of the functional layer" referred to in the present specification can be measured using a field emission scanning electron microscope (FE-SEM), for example.

<Production Method of Functional Layer-Equipped Separator for Electrochemical Device>

The presently disclosed functional layer-equipped separator for an electrochemical device can be produced by, in any of the methods of forming a functional layer previously described in the "Functional layer for electrochemical device" section, using a separator substrate as the substrate, and forming a functional layer on the separator substrate, for example.

(Electrochemical Device)

The presently disclosed electrochemical device includes at least the presently disclosed functional layer-equipped separator for an electrochemical device. Accordingly, the presently disclosed electrochemical device may include constituent elements other than the presently disclosed functional layer so long as they do not cause significant loss of the effects disclosed herein.

The presently disclosed electrochemical device may be a lithium ion secondary battery or an electric double-layer capacitor, for example, but is not specifically limited thereto, and is preferably a lithium ion secondary battery.

The following describes a lithium ion secondary battery as one example of the presently disclosed electrochemical device. A lithium ion secondary battery according to the present disclosure includes the presently disclosed functional layer set forth above. More specifically, the lithium ion secondary battery includes a positive electrode, a negative electrode, the presently disclosed functional layer-equipped separator, and an electrolyte solution. Note that the functional layer may be formed on only one surface of the separator substrate or may be formed on both surfaces of the separator substrate.

In the lithium ion secondary battery according to the present disclosure, the functional layer causes strong adhesion of the positive electrode and the separator substrate and/or of the negative electrode and the separator substrate in the electrolyte solution. Consequently, widening of the distance between electrode plates of the electrodes associated with repeated charging and discharging is inhibited, and good battery characteristics such as cycle characteristics are obtained. Moreover, the functional layer improves the heat resistance of the separator substrate in the lithium ion secondary battery. Furthermore, the time required to produce the separator can be shortened and the lithium ion secondary battery can be produced with high productivity compared to a situation in which a conventional separator including a heat-resistant layer and an adhesive layer is used.

Note that the positive electrode, negative electrode, and electrolyte solution mentioned above can be any known positive electrode, negative electrode, and electrolyte solution that are used in lithium ion secondary batteries.

<Positive Electrode and Negative Electrode>

Specifically, the electrodes (positive electrode and negative electrode) can each be an electrode that is obtained by forming an electrode mixed material layer on a current collector. The current collector may be made of a metal material such as iron, copper, aluminum, nickel, stainless steel, titanium, tantalum, gold, or platinum. Of these metal materials, a current collector made of copper is preferable as a current collector for the negative electrode. Moreover, a current collector made of aluminum is preferable as a current collector for the positive electrode. The electrode mixed material layer can be a layer that contains an electrode active material and a binder.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in terms of readily dissolving in solvents and displaying a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Lithium Ion Secondary Battery>

The lithium ion secondary battery that is an example of the presently disclosed electrochemical device can be produced by, for example, overlapping the previously described positive electrode and negative electrode with the functional layer-equipped separator in-between, performing rolling, folding, or the like of the resultant laminate as necessary, placing the laminate in a battery container, injecting the electrolyte solution into the battery container, and sealing the battery container. In order to prevent pressure increase inside the battery and occurrence of overcharging or overdischarging, an expanded metal, an overcurrent preventing device such as a fuse or a PTC device, or a lead plate may be placed in the battery container as necessary. The shape of the battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer.

In the examples and comparative example, methods described below were used for measurement of glass-transition temperature, melting point, volume-average particle diameter, degree of swelling in electrolyte solution, thickness of an inorganic particle layer, ratio of volume-average particle diameter of a particulate polymer (X) relative to thickness of an inorganic particle layer, mixing ratio (volume ratio and mass ratio) of inorganic particles and a particulate polymer, proportion of protrusion-occupied area, area proportion occupied by a particulate polymer at the surface of protrusions, maximum height Sz and Rz of a surface of a functional layer, and arithmetic mean height Sa of a surface of a functional layer. Moreover, methods described below were used for measurement and evaluation of process adhesiveness of a functional layer, adhesiveness of a functional layer in electrolyte solution, blocking resistance of a functional layer, heat resistance of a functional layer, electrolyte solution injectability, cycle characteristics of a secondary battery, output characteristics of a secondary battery, and preservation characteristics of a secondary battery.

<Glass-Transition Temperature>

A particulate polymer (X) and a particulate polymer (Y) (binder) produced in each example or comparative example were each used as a measurement sample. After weighing 10 mg of the measurement sample into an aluminum pan, a differential scanning calorimeter (EXSTAR DSC6220 produced by SII NanoTechnology Inc.) was used to perform measurement under conditions prescribed by JIS Z 8703 with a measurement temperature range of −100° C. to 500° C. and a heating rate of 10° C./min, and using an empty aluminum pan as a reference, so as to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Melting Point>

The melting point (Tm) of a particulate polymer (X) produced in Example 5 was measured as follows. First, the particulate polymer was heated to cause melting thereof, and then the molten polymer was rapidly cooled by dry ice to obtain an amorphous polymer. This amorphous polymer was then used as a test subject to measure the melting point (Tm) at a heating rate (heating mode) of 10° C./min using a differential scanning calorimeter (DSC).

<Volume-Average Particle Diameter>

<<Volume-Average Particle Diameter of Particulate Polymer (X)>>

A particulate polymer (X) produced in each example or comparative example was used as a measurement sample. An amount equivalent to 0.1 g of the measurement sample was weighed and taken into a beaker, and then 0.1 mL of alkylbenzenesulfonic acid aqueous solution (DRIWEL produced by FUJIFILM Corporation) was added as a dispersant. In addition, 10 mL to 30 mL of a diluent (ISOTON II produced by Beckman Coulter, Inc.) was added into the beaker, and 3 minutes of dispersing was performed using a 20 W (watt) ultrasonic disperser. A particle diameter meter (Multisizer produced by Beckman Coulter, Inc.) was subsequently used to determine the volume-average particle diameter of the measurement sample under conditions of an aperture diameter of 20 μm, a medium of ISOTON II, and a measured particle count of 100,000 particles.

<<Volume-Average Particle Diameter of Binder (Particulate Polymer (Y))>>

The volume-average particle diameter of a binder (particulate polymer (Y)) produced in each example was measured by laser diffraction. Specifically, a produced water dispersion (adjusted to a solid content concentration of 0.1 mass %) containing the binder was used as a sample. In a particle diameter distribution (by volume) measured using a laser diffraction particle diameter distribution analyzer (LS-230 produced by Beckman Coulter, Inc.), the particle diameter D50 at which cumulative volume calculated from a small diameter end of the distribution reached 50% was taken to be the volume-average particle diameter.

<<Volume-Average Particle Diameter of Inorganic Particles>>

In a particle diameter distribution (by volume) for inorganic particles measured by laser diffraction, the particle diameter (D50) at which cumulative volume calculated from a small diameter end of the distribution reached 50% was taken to be the volume-average particle diameter of the inorganic particles.

<Degree of Swelling in Electrolyte Solution>

A water dispersion containing a particulate polymer (X) produced in each example or comparative example was loaded into a petri dish made of polytetrafluoroethylene and was dried under conditions of 48 hours at 25° C. to produce a powder. Approximately 0.2 g of the obtained powder was pressed at 200° C. and 5 MPa for 2 minutes to obtain a film. The obtained film was cut to a 1 cm square to obtain a test specimen. The mass W0 of this test specimen was measured.

The test specimen described above was then immersed in electrolyte solution at 60° C. for 72 hours. Thereafter, the test specimen was removed from the electrolyte solution, electrolyte solution on the surface of the test specimen was wiped off, and the mass W1 of the test specimen after immersion was measured.

The measured masses W0 and WI were used to calculate the degree of swelling in electrolyte solution S (factor) by S=W1/W0.

Note that the electrolyte solution was a solution obtained by dissolving $LiPF_6$ with a concentration of 1 mol/L as a supporting electrolyte in a mixed solvent of ethylene carbonate (EC), diethyl carbonate (DEC), and vinylene carbonate (VC) (volume ratio: EC/DEC/VC=68.5/30/1.5).

<Thickness of Inorganic Particle Layer>

A cross-section of a functional layer-equipped separator was observed using the field emission scanning electron microscope (FE-SEM), and the thickness of an inorganic particle layer was calculated from an obtained SEM image. Note that the thickness of the inorganic particle layer was taken to be the distance from the surface of the separator substrate onto which the slurry composition was applied to an inorganic particle furthest therefrom in a vertical direction.

<Ratio of Volume-Average Particle Diameter of Particulate Polymer (X) Relative to Thickness of Inorganic Particle Layer>

A ratio of the volume-average particle diameter of a particulate polymer (X) relative to the thickness of an inorganic particle layer (volume-average particle diameter of particulate polymer (X)/thickness of inorganic particle layer) was determined based on the volume-average particle diameter of the particulate polymer (X) and the thickness of the inorganic particle layer that were determined as described above.

<Mixing Ratio of Inorganic Particles and Particulate Polymer>

A mixing ratio (volume ratio and mass ratio) of inorganic particles (alumina) and a particulate polymer (X) and a mixing ratio (volume ratio and mass ratio) of inorganic particles (alumina) and the total amount of particulate polymers (X) and (Y) were each determined from the charged amounts of the inorganic particles (alumina) and the particulate polymers in production of a slurry composition. Note that the density of alumina was taken to be 4 $g/cm^3$ in this calculation.

<Proportion of Protrusion-Occupied Area>

The proportion of protrusion-occupied area was measured by using a laser displacement sensor microscope (produced by Keyence Corporation; model: VK-X1000) to calculate the area of locations protruding 1 μm or more from the plane of arithmetic mean height Sa, which was taken as a reference.

<Area Proportion Occupied by Particulate Polymer at Protrusion Surface>

The area proportion occupied by a particulate polymer at the surface of protrusions was measured by measuring the surface of a separator by SEM-EDX and performing element mapping of C and Al.

<Maximum Height Sz and Rz and Arithmetic Mean Height Sa of Surface of Functional Layer>

A functional layer-equipped separator for an electrochemical device produced in each example or comparative example was observed using a laser displacement sensor microscope (produced by Keyence Corporation; model: VK-X1000). Measurement was performed for an arbitrary region of 100 μm-square at 10 locations on the surface of a functional layer, and the maximum height Sz and the arithmetic mean height Sa of the surface of the functional layer were calculated. In addition, for an arbitrary region of 100 μm-square at the functional layer surface, the maximum height Rz was calculated for each of 10 profile curves drawn in parallel at equal intervals of 7 μm as viewed from above. An average value of these calculated values was taken to be a measurement value for one location, and then an average value of measurement values obtained through measurement performed in the same manner at 10 locations, in total, was determined as the maximum height Rz of the surface of the functional layer.

<Process Adhesiveness of Functional Layer>

A positive electrode, a negative electrode, and a functional layer-equipped separator produced in each example or comparative example were each cut out as 10 mm in width and 50 mm in length. The positive electrode and the functional layer-equipped separator were stacked such that a surface at the positive electrode mixed material layer-side of the positive electrode faced toward the functional layer-equipped separator, and were pressed by roll pressing under conditions of a temperature of 70° C., a load of 8 kN/m, and a pressing speed of 30 m/min to obtain a joined product in which the positive electrode and the functional layer-equipped separator were joined.

The obtained joined product was placed with a surface at the current collector-side of the positive electrode facing downward, and cellophane tape was affixed to the surface of the electrode. Tape prescribed by JIS Z1522 was used as the cellophane tape. The cellophane tape was secured to a horizontal test stage in advance. Thereafter, the stress when the functional layer-equipped separator was peeled off by pulling one end of the functional layer-equipped separator vertically upward at a pulling speed of 50 mm/min was measured.

The same operations as when using the positive electrode were performed for the negative electrode produced in each example or comparative example in order to perform measurement of stress.

The measurement of stress described above was performed 3 times for a joined product of a positive electrode and a functional layer-equipped separator and 3 times for a joined product of a negative electrode and a functional layer-equipped separator (i.e., 6 times in total), an average value of the stresses was determined, and the obtained average value was taken to be the peel strength (N/m).

The calculated peel strength was used to evaluate the process adhesiveness of the electrodes and the functional layer-equipped separator by the following standard. A larger peel strength indicates that a functional layer has better process adhesiveness.

A: Peel strength of 3 N/m or more
B: Peel strength of not less than 2 N/m and less than 3 N/m
C: Peel strength of less than 2 N/m <Adhesiveness of Functional Layer in Electrolyte Solution>

A negative electrode and a functional layer-equipped separator produced in each example or comparative example were each cut out as 10 mm in width and 50 mm in length. The negative electrode and the functional layer-equipped separator were stacked such that a surface at the negative electrode mixed material layer-side of the negative electrode faced toward the functional layer-equipped separator, were pressed at a pressing speed of 30 m/min by roll pressing with a temperature of 70° C. and a load of 10 kN/m, and were subsequently immersed in electrolyte solution for 24 hours to obtain a test specimen.

Thereafter, the test specimen was removed from the electrolyte solution, and a polyethylene terephthalate (PET) film for preventing electrolyte solution evaporation was subsequently placed at the separator-side of the test specimen. The test specimen was then placed with a surface at the current collector-side of the negative electrode facing downward, and cellophane tape was affixed to the surface of the electrode. Tape prescribed by JIS Z1522 was used as the cellophane tape. The cellophane tape was secured to a horizontal test stage in advance. The stress when the separator substrate was peeled off by pulling one end of the separator substrate vertically upward at a pulling speed of 50 mm/min was measured.

This measurement was performed three times, and an average value for the total of three stresses obtained thereby was determined as the peel strength (N/m) and was evaluated by the following standard as the adhesiveness of a functional layer in electrolyte solution. A larger peel strength indicates better adhesiveness of a functional layer in electrolyte solution.

A: Peel strength of 0.30 N/m or more
B: Peel strength of not less than 0.15 N/m and less than 0.30 N/m
C: Peel strength of less than 0.15 N/m <Blocking Resistance of Functional Layer>

Two pieces having a size of 4 cm in width by 4 cm in length were cut out from a functional layer-equipped separator produced in each example or comparative example to obtain test specimens. The two obtained test specimens were overlapped with the functional layer-sides thereof facing each other and were then pressed at a temperature of 40° C. and a pressure of 5 MPa for 2 minutes to obtain a pressed product. One end of the pressed product that had been obtained was fixed in place, the stress when the other end of the pressed product was pulled vertically upward at a pulling speed of 50 mm/min to cause peeling was measured, and the obtained stress was taken to be the blocking strength. The blocking strength was evaluated by the following standard. A smaller blocking strength indicates that a functional layer inhibits blocking well, and thus indicates that the functional layer has higher blocking resistance.

A: Less than 4 N/m
B: Not less than 4 N/m and less than 6 N/m
C: 6 N/m or more

<Heat Resistance of Functional Layer>

A square of 12 cm in width by 12 cm in length was cut out from a functional layer-equipped separator produced in each example or comparative example. A square having a side length of 10 cm was then drawn in an inner part of the obtained square to obtain a test specimen. The test specimen was placed in a 150° C. thermostatic tank and was left in the thermostatic tank for 1 hour. Thereafter, the area change of the square drawn in the inner part of the test specimen (={(area of square before being left−area of square after being left)/area of square before being left}×100%) was determined as the heat shrinkage rate and was evaluated by the following standard. A smaller heat shrinkage rate indicates that the functional layer-equipped separator has better heat resistance.

A: Heat shrinkage rate of less than 3%
B: Heat shrinkage rate of not less than 3% and less than 5%
C: Heat shrinkage rate of 5% or more <Electrolyte Solution Injectability>

Electrolyte solution was injected into a lithium ion secondary battery produced in each example or comparative example. The inside of the lithium ion secondary battery was depressurized to −100 kPa, and this state was maintained for 1 minute. Thereafter, heat sealing was performed. Once 10 minutes had passed, an electrode (positive electrode) was dismantled and the impregnation state of electrolyte solution in the electrode was visually checked. An evaluation was made by the following standard. A larger section impregnated with electrolyte solution in the electrode indicates higher electrolyte solution injectability.

A: Electrolyte solution impregnates entire face of electrode
B: Section of less than 1 $cm^2$ remains unimpregnated with electrolyte solution in electrode (excluding when the entire face is impregnated)
C: Section of 1 $cm^2$ or more remains unimpregnated with electrolyte solution in electrode <Cycle Characteristics of Secondary Battery>

A lithium ion secondary battery produced in each example or comparative example was left at rest at a temperature of 25° C. for 5 hours after electrolyte solution injection. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging (upper limit cell voltage 4.20 V) was performed by a 0.2 C constant-current method and CC discharging to 3.00 V was performed by a 0.2 C constant-current method. This charging and discharging at 0.2 C was repeated 3 times.

Thereafter, the lithium ion secondary battery was subjected to 100 cycles of a charge/discharge operation with a cell voltage of 4.20 V to 3.00 V and a charge/discharge rate of 1.0 C in an environment having a temperature of 25° C. The discharge capacity of the 1st cycle was defined as X1 and the discharge capacity of the $100^{th}$ cycle was defined as X2.

A capacity maintenance rate $\Delta C'$ (=(X2/X1)×100(%)) was determined using the discharge capacity X1 and the discharge capacity X2 and was evaluated by the following standard. A larger value for the capacity maintenance rate $\Delta C'$ indicates that the secondary battery has better cycle characteristics.

A: Capacity maintenance rate $\Delta C'$ of 93% or more
B: Capacity maintenance rate $\Delta C'$ of not less than 90% and less than 93%
C: Capacity maintenance rate $\Delta C'$ of not less than 87% and less than 90%

<Output Characteristics of Secondary Battery>

A lithium ion secondary battery produced in each example or comparative example was constant-current constant-voltage (CCCV) charged to 4.3 V in an atmosphere having a temperature of 25° C. for cell preparation. The prepared cell was discharged to 3.0 V by 0.2 C and 1.5 C constant-current methods to determine electric capacities for these methods. A discharge capacity maintenance rate expressed by the ratio of the electric capacities (=(electric capacity at 1.5 C/electric capacity at 0.2 C)×100(%)) was determined. This measurement was performed for five lithium ion secondary battery cells. An average value for the discharge capacity maintenance rates of these cells was determined and was evaluated by the following standard. A larger value for the discharge capacity maintenance rate indicates that a secondary battery has better output characteristics.

A: Discharge capacity maintenance rate average value of 90% or more
B: Discharge capacity maintenance rate average value of not less than 85% and less than 90%
C: Discharge capacity maintenance rate average value of not less than 75% and less than 85%

<Preservation Characteristics of Secondary Battery>

A lithium ion secondary battery produced in each example or comparative example was constant-current constant-voltage (CCCV) charged to 4.2 V inside a thermostatic tank set to a temperature of 25° C. Thereafter, the temperature of the thermostatic tank was raised to 60° C., and the lithium ion secondary battery was then stored for 1 month. The temperature of the thermostatic tank was subsequently lowered to 25° C. and 2 hours of heat removal was performed. Thereafter, the lithium ion secondary battery was 0.2 C constant-current discharged to 3V, and was then once again CC-CV charged (upper limit cell voltage 4.20 V) by a 0.2 C constant-current method and CC discharged to 3.00 V by a 0.2 C constant-current method. A ratio of the discharge capacities at 0.2 C before and after storage at 60° C. was determined as a preservation characteristic and was evaluated by the following standard. A larger value for the preservation characteristic indicates that the secondary battery has better storage characteristics.

A: Preservation characteristic of 93% or more
B: Preservation characteristic of not less than 90% and less than 93%
C: Preservation characteristic of less than 90%

Example 1

<Production of Particulate Polymer (X1)>
<<Production of Monomer Composition (X1)>>

A monomer composition (X1) was produced by mixing 81.9 parts of styrene as an aromatic vinyl monomer, 18 parts of 2-ethylhexyl acrylate as a (meth)acrylic acid ester monomer, and 0.1 parts of ethylene glycol dimethacrylate as a cross-linkable monomer.

<<Production of Metal Hydroxide>>

A colloidal dispersion liquid (X1) containing magnesium hydroxide as a metal hydroxide was produced through gradual addition under stirring of an aqueous solution of 5.6 parts of sodium hydroxide dissolved in 50 parts of deionized water to an aqueous solution of 8.0 parts of magnesium chloride dissolved in 200 parts of deionized water.

<<Suspension Polymerization>>

A particulate polymer (X1) was produced by suspension polymerization. Specifically, the monomer composition (X1) obtained as described above was added to the colloidal dispersion liquid (X1) containing magnesium hydroxide, further stirring thereof was performed, and then 2.0 parts of t-butyl peroxy-2-ethylhexanoate (PERBUTYL O produced by NOF Corporation) was added as a polymerization initiator to obtain a mixed liquid. The obtained mixed liquid was subjected to 1 minute of high-shear stirring at a rotation speed of 15,000 rpm using an inline emulsifying/dispersing device (CAVITRON produced by Pacific Machinery & Engineering Co., Ltd.) to form droplets of the monomer composition (X1) in the colloidal dispersion liquid (X1) containing magnesium hydroxide.

The colloidal dispersion liquid (X1) containing magnesium hydroxide was then loaded into a reactor, was heated to 90° C., and a polymerization reaction was performed for 5 hours to yield a water dispersion containing a particulate polymer (X1).

The water dispersion containing the particulate polymer (X1) was used to measure the volume-average particle diameter and degree of swelling in electrolyte solution of the particulate polymer (X1). The results are shown in Table 1.

Sulfuric acid was added dropwise to the water dispersion containing the particulate polymer (X1) under stirring at room temperature (25° C.), and acid washing was performed until the pH reached 6.5 or lower. Next, separation was performed by filtration, 500 parts of deionized water was added to the obtained solid content to once again form a slurry, and water washing treatment (washing, filtration, and dehydration) was repeated a number of times. Separation was subsequently performed by filtration, and the obtained solid content was loaded into a vessel of a dryer and was dried at 40° C. for 48 hours to obtain dried particulate polymer (X1).

The glass-transition temperature of the obtained particulate polymer (X1) was measured. The result is shown in Table 1.

<Production of Water Dispersion Containing Binder (α) (Particulate Polymer (Y1))>

A reactor including a stirrer was charged with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate as a polymerization initiator, the gas phase was purged with nitrogen gas, and heating was performed to 60° C.

Meanwhile, a monomer composition (α) was produced in a separate vessel by mixing 50 parts of deionized water, 0.5 parts of sodium dodecylbenzenesulfonate as a dispersion stabilizer, 94 parts of n-butyl acrylate as a (meth)acrylic acid ester monomer, 2 parts of methacrylic acid as an acid group-containing monomer, 2 parts of acrylonitrile as a nitrile group-containing monomer, and 1 part of allyl methacrylate and 1 part of allyl glycidyl ether as cross-linkable monomers.

The obtained monomer composition (α) was continuously added to the aforementioned reactor including a stirrer over 4 hours to carry out polymerization. The reaction was carried out at 60° C. during this addition. Once the addition was complete, a further 3 hours of stirring was performed at 70° C., and then the reaction was ended to yield a water dispersion containing a particulate binder (α) (particulate polymer (Y1)) as an acrylic polymer. The volume-average particle diameter and glass-transition temperature of the obtained binder (α) (particulate polymer (Y1)) were measured. The results are shown in Table 1.

<Production of Slurry Composition>

After adding 0.5 parts of polyacrylic acid as a dispersant to 100 parts of alumina (AKP3000 produced by Sumitomo Chemical Co., Ltd.; volume-average particle diameter: 0.7 µm) as inorganic particles, 6 parts in terms of solid content of the water dispersion containing the binder (α) (particulate polymer (Y1)) and 1.5 parts of carboxymethyl cellulose as a thickener were further added, the solid content concentration was adjusted to 55% through addition of deionized water, and mixing was performed using a ball mill to obtain a pre-mixing slurry.

A mixture was obtained by adding 0.2 parts of sodium dodecylbenzenesulfonate (NEOPELEX G-15 produced by Kao Corporation) as an emulsifier to 100 parts of the particulate polymer (X1), further adding deionized water to adjust the solid content concentration to 40%, and performing mixing thereof. The obtained mixture and the pre-mixing slurry obtained as described above were mixed such that the mixing ratio of the inorganic particles (alumina) and the particulate polymer (X1) was a mixing ratio shown in Table 1, and deionized water was added to adjust the solid content concentration to 40% and thereby yield a slurry composition (composition for functional layer). A mixing ratio (volume ratio and mass ratio) of the inorganic particles (alumina) and the total amount of the particulate polymers (X1) and (Y1) was determined from the charged amounts of the inorganic particles (alumina), the particulate polymer (X1), and the particulate polymer (Y1) in production of the slurry composition. The results are shown in Table 1.

<Production of Functional Layer-Equipped Separator>

A microporous membrane made of polyethylene (thickness: 12 µm) was prepared as a separator substrate. The slurry composition obtained as described above was then applied onto one surface of the separator substrate by bar coating. Next, the separator substrate onto which the slurry composition had been applied was dried at 50° C. for 1 minute to form a functional layer. The same operations were performed with respect to the other surface of the separator substrate so as to produce a functional layer-equipped separator that included functional layers at both surfaces of the separator substrate. Note that the thickness of an inorganic particle layer in each of the functional layers was measured and was found to be 2.0 µm.

<Production of Positive Electrode>

A slurry composition for a positive electrode was produced by mixing 100 parts of LiCoO$_2$ (volume-average particle diameter: 12 µm) as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone as a solvent such that the total solid content concentration was 70%, and then mixing these materials in a planetary mixer.

The slurry composition for a positive electrode was applied onto aluminum foil of 20 µm in thickness serving as a current collector by a comma coater such as to have a thickness after drying of approximately 150 µm. The applied slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a post-pressing positive electrode including a positive electrode mixed material layer (thickness: 60 µm).

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was quenched by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution and was then subjected to thermal-vacuum distillation to remove unreacted monomer. Thereafter, the mixture was cooled to 30° C. or lower to yield a water dispersion containing the target binder for a negative electrode mixed material layer.

After blending 80 parts of artificial graphite (volume-average particle diameter: 15.6 µm) as a negative electrode active material (1) and 16 parts of a silicon-based active material SiO$_x$ (volume-average particle diameter: 4.9 µm) as a negative electrode active material (2), mixing 2.5 parts in terms of solid content of a 2% aqueous solution of carboxymethyl cellulose sodium salt (MAC350HC produced by Nippon Paper Industries Co., Ltd.) as a viscosity modifier and deionized water therewith, and adjusting the solid content concentration to 68%, a further 60 minutes of mixing was performed at 25° C. The solid content concentration was further adjusted to 62% with deionized water, and a further 15 minutes of mixing was performed at 25° C. to obtain a mixed liquid. Deionized water and 1.5 parts in terms of solid content of the water dispersion containing the binder for a negative electrode mixed material layer were added to the mixed liquid, the final solid content concentration was adjusted to 52%, and a further 10 minutes of mixing was performed to obtain a mixed liquid. This mixed liquid was subjected to a defoaming process under reduced pressure to yield a slurry composition for a negative electrode having good fluidity.

The slurry composition for a negative electrode was applied onto copper foil of 20 µm in thickness serving as a current collector by a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode including a negative electrode mixed material layer (thickness: 80 μm).

The functional layer-equipped separator obtained as described above was used to determine the inorganic particle-occupied area, the thickness of an inorganic particle layer, and the ratio of the volume-average particle diameter of a particulate polymer relative to the thickness of the inorganic particle layer. In addition, the functional layer-equipped separator was used to measure the maximum height Sz and Rz and the arithmetic mean height Sa of the surface of a functional layer. Moreover, the functional layer-equipped separator, positive electrode, and negative electrode obtained as described above were used to evaluate the process adhesiveness of a functional layer, the adhesiveness of a functional layer in electrolyte solution, the blocking resistance of a functional layer, the heat resistance of a functional layer. The results are shown in Table 1.

Upon analysis by energy dispersive X-ray spectroscopy (SEM-EDX) (SEM main body: Ultra-55 produced by Carl Zeiss AG; EDX: Quantax-400 produced by Bruker Corporation) of a cross-section of the functional layer-equipped separator that was obtained as described above, the functional layers were confirmed to include a plurality of protrusions each containing a particulate polymer at the surface thereof.

<Production of Lithium Ion Secondary Battery>

The post-pressing positive electrode produced as described above was cut out as a rectangle of 49 cm×5 cm and was placed with the surface at the positive electrode mixed material layer-side thereof facing upward. The functional layer-equipped separator was cut out as 120 cm×5.5 cm and was arranged on the positive electrode mixed material layer such that the positive electrode was positioned at one side of the functional layer-equipped separator in a longitudinal direction. In addition, the post-pressing negative electrode produced as described above was cut out as a rectangle of 50 cm×5.2 cm and was arranged on the functional layer-equipped separator such that a surface at the negative electrode mixed material layer-side thereof faced toward the functional layer-equipped separator and such that the negative electrode was positioned at the other side of the functional layer-equipped separator in the longitudinal direction. The resultant laminate was wound by a winding machine to obtain a roll.

This roll was pressed at 70° C. and 1 MPa to obtain a flattened roll, the flattened roll was packed into an aluminum packing case serving as a battery case, and electrolyte solution (solvent: ethylene carbonate/diethyl carbonate/vinylene carbonate (volume ratio)=68.5/30/1.5; electrolyte: $LiPF_6$ of 1 mol in concentration) was injected such that no air remained. An opening of the aluminum packing case was heat sealed at a temperature of 150° C. to close the aluminum packing case and thereby produce a wound lithium ion secondary battery having a capacity of 800 mAh.

The obtained lithium ion secondary battery was used to evaluate the electrolyte solution injectability, cycle characteristics, output characteristics, and preservation characteristics of the secondary battery. The results are shown in Table 1.

Example 2

A functional layer-equipped separator, a positive electrode, and a negative electrode were produced, and a lithium ion secondary battery was obtained in the same way as in Example 1 with the exception that a particulate polymer (X2) produced as described below was used instead of the particulate polymer (X1) in production of the slurry composition. Various measurements and evaluations were performed in the same manner as in Example 1. The results are shown in Table 1.

<Production of Particulate Polymer (X2)>

The particulate polymer (X2) was produced by performing the same operations as in Example 1 with the exception that a colloidal dispersion liquid (X2) containing magnesium hydroxide was used instead of the colloidal dispersion liquid (X1) containing magnesium hydroxide as a metal hydroxide in production of the particulate polymer.

Note that the colloidal dispersion liquid (X2) containing magnesium hydroxide was produced through gradual addition under stirring of an aqueous solution of 7.0 parts of sodium hydroxide dissolved in 50 parts of deionized water to an aqueous solution of 10.0 parts of magnesium chloride dissolved in 200 parts of deionized water.

Example 3

A functional layer-equipped separator, a positive electrode, and a negative electrode were produced, and a lithium ion secondary battery was obtained in the same way as in Example 1 with the exception that a particulate polymer (X3) produced as described below was used instead of the particulate polymer (X1) in production of the slurry composition. Various measurements and evaluations were performed in the same manner as in Example 1. The results are shown in Table 1.

<Production of Particulate Polymer (X3)>

The particulate polymer (X3) was produced by performing the same operations as in Example 1 with the exception that a colloidal dispersion liquid (X3) containing magnesium hydroxide was used instead of the colloidal dispersion liquid (X1) containing magnesium hydroxide as a metal hydroxide in production of the particulate polymer.

Note that the colloidal dispersion liquid (X3) containing magnesium hydroxide was produced through gradual addition under stirring of an aqueous solution of 5.6 parts of sodium hydroxide dissolved in 50 parts of deionized water to an aqueous solution of 8.0 parts of magnesium chloride dissolved in 200 parts of deionized water.

Example 4

A functional layer-equipped separator, a positive electrode, and a negative electrode were produced, and a lithium ion secondary battery was obtained in the same way as in Example 1 with the exception that a particulate polymer (X4) produced as described below was used instead of the particulate polymer (X1) in production of the slurry composition. Various measurements and evaluations were performed in the same manner as in Example 1. The results are shown in Table 1.

<Production of Particulate Polymer (X4)>

The particulate polymer (X4) was produced by performing the same operations as in Example 1 with the exception that a monomer composition (X4) was used instead of the monomer composition (X1) in production of the particulate polymer.

The monomer composition (X4) was produced by mixing 20.9 parts of n-butyl acrylate as a (meth)acrylic acid ester monomer, 20 parts of acrylonitrile as a nitrile group-containing monomer, 59 parts of methyl methacrylate as a (meth)acrylic acid ester monomer, and 0.1 parts of ethylene glycol dimethacrylate as a cross-linkable monomer.

Example 5

A functional layer-equipped separator, a positive electrode, and a negative electrode were produced, and a lithium ion secondary battery was obtained in the same way as in Example 1 with the exception that a particulate polymer (X5) produced as described below was used instead of the particulate polymer (X1) in production of the slurry composition. Various measurements and evaluations were performed in the same manner as in Example 1. The results are shown in Table 1.

<Production of Particulate Polymer (X5)>

The inside of a 1 L autoclave equipped with a stirrer was sufficiently purged with nitrogen, and then 400 g of deoxygenated pure water, 4 g of ammonium perfluorodecanoate as an emulsifier, and Poval as a dispersion stabilizer were charged to the autoclave and were heated to 60° C. under stirring at 100 rpm. Next, a mixed gas of 90 parts of vinylidene fluoride (VDF) and 10 parts of hexafluoropropylene (HFP) was charged to the autoclave until the internal pressure reached 3 MPa (gauge pressure). Thereafter, diisopropyl peroxydicarbonate was added as a polymerization initiator to initiate polymerization, and a reaction was continued for 3 hours. The reaction liquid was cooled and stirring was stopped, and then unreacted monomer was discharged to end the reaction and yield a latex of a fluorine-containing polymer as a particulate polymer (X5).

Example 6

A functional layer-equipped separator, a positive electrode, and a negative electrode were produced, and a lithium ion secondary battery was obtained in the same way as in Example 1 with the exception that in production of the slurry composition, the mixing ratio of the inorganic particles (alumina) and the particulate polymer (X1) in the slurry composition was adjusted such that the volume ratio (inorganic particles (alumina):particulate polymer (X1)) was 80:20. Various measurements and evaluations were performed in the same manner as in Example 1. The results are shown in Table 1.

Example 7

A functional layer-equipped separator, a positive electrode, and a negative electrode were produced, and a lithium ion secondary battery was obtained in the same way as in Example 1 with the exception that in production of the slurry composition, the mixing ratio of the inorganic particles (alumina) and the particulate polymer (X1) in the slurry composition was adjusted such that the volume ratio (inorganic particles (alumina):particulate polymer (X1)) was 60:40. Various measurements and evaluations were performed in the same manner as in Example 1. The results are shown in Table 1.

Example 8

A functional layer-equipped separator, a positive electrode, and a negative electrode were produced, and a lithium ion secondary battery was obtained in the same way as in Example 1 with the exception that a particulate polymer (X6) produced as described below was used instead of the particulate polymer (X1) in production of the slurry composition. Various measurements and evaluations were performed in the same manner as in Example 1. The results are shown in Table 1.

<Production of Particulate Polymer (X6)>

The particulate polymer (X6) was produced by performing the same operations as in Example 1 with the exception that a monomer composition (X6) was used instead of the monomer composition (X1) in production of the particulate polymer.

The monomer composition (X6) was produced by mixing 60 parts of styrene as an aromatic vinyl monomer, 39.9 parts of 2-ethylhexyl acrylate as a (meth)acrylic acid ester monomer, and 0.1 parts of ethylene glycol dimethacrylate as a cross-linkable monomer.

Example 9

A functional layer-equipped separator, a positive electrode, and a negative electrode were produced, and a lithium ion secondary battery was obtained in the same way as in Example 1 with the exception that a particulate polymer (X7) produced as described below was used instead of the particulate polymer (X1) in production of the slurry composition. Various measurements and evaluations were performed in the same manner as in Example 1. The results are shown in Table 1.

<Production of Particulate Polymer (X7)>

The particulate polymer (X7) was produced by performing the same operations as in Example 1 with the exception that a monomer composition (X7) was used instead of the monomer composition (X1) in production of the particulate polymer.

The monomer composition (X7) was produced by mixing 89.9 parts of styrene as an aromatic vinyl monomer, 10 parts of 2-ethylhexyl acrylate as a (meth)acrylic acid ester monomer, and 0.1 parts of ethylene glycol dimethacrylate as a cross-linkable monomer.

Example 10

A functional layer-equipped separator, a positive electrode, and a negative electrode were produced, and a lithium ion secondary battery was obtained in the same way as in Example 1 with the exception that a water dispersion containing a binder (0) (particulate polymer (Y2)) that was produced as described below was used instead of the water dispersion containing the binder (α) (particulate polymer (Y1)) in production of the slurry composition. Various measurements and evaluations were performed in the same manner as in Example 1. The results are shown in Table 1.

<Production of Water Dispersion Containing Binder (0) (Particulate Polymer (Y2))>

A reactor including a stirrer was charged with 70 parts of deionized water, 0.15 parts of polyoxyethylene lauryl ether (EMULGEN® 120 (EMULGEN is a registered trademark in Japan, other countries, or both) produced by Kao Corporation) as an emulsifier, and 0.5 parts of ammonium persulfate as a polymerization initiator, the gas phase was purged with nitrogen gas, and heating was performed to 60° C.

Meanwhile, a monomer composition (p) was produced in a separate vessel by mixing 50 parts of deionized water, 0.5 parts of polyoxyethylene lauryl ether (EMULGEN® 120 produced by Kao Corporation) as an emulsifier, 70 parts of 2-ethylhexyl acrylate as a (meth)acrylic acid alkyl ester monomer, 25 parts of styrene as an aromatic vinyl monomer, 1.7 parts of allyl glycidyl ether and 0.3 parts of allyl methacrylate as cross-linkable monomers, and 3 parts of acrylic acid as an acid group-containing monomer.

The obtained monomer composition (p) was continuously added to the aforementioned reactor including a stirrer over 4 hours to carry out polymerization. The reaction was carried out at 70° C. during this addition. Once the addition was complete, a further 3 hours of stirring was performed at 80° C., and then the reaction was ended to yield a water dispersion containing a particulate binder (0) (particulate polymer (Y2)). The obtained water dispersion containing the binder (p) (particulate polymer (Y2)) was used to measure the volume-average particle diameter and glass-transition temperature of the binder (p) (particulate polymer (Y2)). These are shown in Table 1.

Example 11

A functional layer-equipped separator, a positive electrode, and a negative electrode were produced, and a lithium ion secondary battery was obtained in the same way as in Example 1 with the exception that a water dispersion containing a binder (γ) (particulate polymer (Y3)) that was produced as described below was used instead of the water dispersion containing the binder (α) (particulate polymer (Y1)) in production of the slurry composition. Various measurements and evaluations were performed in the same manner as in Example 1. The results are shown in Table 1.
<Production of Water Dispersion Containing Binder (γ) (Particulate Polymer (Y3))>

A mixture containing 33 parts of 1,3-butadiene as an aliphatic conjugated diene monomer, 62 parts of styrene as an aromatic vinyl monomer, 4 parts of itaconic acid as a carboxy group-containing monomer, 0.3 parts of t-dodecyl mercaptan as a chain transfer agent, and 0.3 parts of sodium lauryl sulfate as an emulsifier was loaded into a vessel A. A polymerization reaction was initiated by initiating addition of the mixture into a pressure-resistant vessel B from the vessel A, and, simultaneously thereto, initiating addition of 1 part of potassium persulfate as a polymerization initiator into the pressure-resistant vessel B. A reaction temperature of 75° C. was maintained during this addition.

Once 4 hours had passed from the start of polymerization (i.e., once 70% of the mixture had been added into the pressure-resistant vessel B), 1 part of 2-hydroxyethyl acrylate (acrylic acid-2-hydroxyethyl) as a hydroxy group-containing monomer was added into the pressure-resistant vessel B over 1 hour and 30 minutes.

Addition of the total amount of the above-described monomers was completed 5 hours and 30 minutes after the start of polymerization. Heating was subsequently performed to 85° C., and a reaction was carried out for 6 hours. The reaction was quenched by cooling at the point at which the polymerization conversion rate reached 97% to yield a mixture containing a particulate polymer (γ1). The obtained mixture was adjusted to pH 8 through addition of 5% sodium hydroxide aqueous solution. Unreacted monomer was subsequently removed through thermal-vacuum distillation. Cooling was then performed to yield a water dispersion (solid content concentration: 40%) containing a styrene-butadiene copolymer (SBR) as a particulate binder (γ) (particulate polymer (Y3)). The obtained water dispersion containing the binder (γ) (particulate polymer (Y3)) was used to measure the volume-average particle diameter and glass-transition temperature of the binder (γ) (particulate polymer (Y3)). The results are shown in Table 1.

Example 12

A functional layer-equipped separator, a positive electrode, and a negative electrode were produced, and a lithium ion secondary battery was obtained in the same way as in Example 1 with the exception that 1 part (in terms of solid content) of polyvinyl alcohol (Kuraray Poval PVA-110 produced by Kuraray Co., Ltd.), which is a water-soluble polymer, was added as a binder (6) instead of the water dispersion of the binder (α) (particulate polymer (Y1)) in production of the slurry composition. Various measurements and evaluations were performed in the same manner as in Example 1. The results are shown in Table 1.

Example 13

A functional layer-equipped separator, a positive electrode, and a negative electrode were produced, and a lithium ion secondary battery was obtained in the same way as in Example 1 with the exception that a particulate polymer (X8) produced as described below was used instead of the particulate polymer (X1) in production of the slurry composition. Various measurements and evaluations were performed in the same manner as in Example 1. The results are shown in Table 1.
<Production of Particulate Polymer (X8)>

The particulate polymer (X8) was produced by performing the same operations as in Example 1 with the exception that a monomer composition (X8) was used instead of the monomer composition (X1) in production of the particulate polymer.

The monomer composition (X8) was produced by mixing 78.5 parts of styrene as an aromatic vinyl monomer, 20 parts of n-butyl acrylate as a (meth)acrylic acid ester monomer, and 1 part of glycidyl methacrylate (epoxy group-containing unsaturated monomer) and 0.5 parts of ethylene glycol dimethacrylate as cross-linkable monomers.

Example 14

A functional layer-equipped separator, a positive electrode, and a negative electrode were produced, and a lithium ion secondary battery was obtained in the same way as in Example 1 with the exception that a particulate polymer (X9) produced as described below was used instead of the particulate polymer (X1) in production of the slurry composition. Various measurements and evaluations were performed in the same manner as in Example 1. The results are shown in Table 1.
<Production of Particulate Polymer (X9)>

The particulate polymer (X9) was produced by performing the same operations as in Example 1 with the exception that a monomer composition (X9) was used instead of the monomer composition (X1) in production of the particulate polymer.

The monomer composition (X9) was produced by mixing 59.5 parts of styrene as an aromatic vinyl monomer, 20 parts of n-butyl acrylate as a (meth)acrylic acid ester monomer, and 20 parts of glycidyl methacrylate (epoxy group-containing unsaturated monomer) and 0.5 parts of ethylene glycol dimethacrylate as cross-linkable monomers.

Example 15

A functional layer-equipped separator, a positive electrode, and a negative electrode were produced, and a lithium ion secondary battery was obtained in the same way as in Example 1 with the exception that a particulate polymer (X10) produced as described below was used instead of the particulate polymer (X1) in production of the slurry composition. Various measurements and evaluations were performed in the same manner as in Example 1. The results are shown in Table 1.

<Production of Particulate Polymer (X10)>

The particulate polymer (X10) was produced by performing the same operations as in Example 1 with the exception that a monomer composition (X10) was used instead of the monomer composition (X1) in production of the particulate polymer.

The monomer composition (X10) was produced by mixing 78.5 parts of styrene as an aromatic vinyl monomer, 20 parts of n-butyl acrylate as a (meth)acrylic acid ester monomer, and 1 part of allyl glycidyl ether (epoxy group-containing unsaturated monomer) and 0.5 parts of ethylene glycol dimethacrylate as cross-linkable monomers.

Example 16

A functional layer-equipped separator, a positive electrode, and a negative electrode were produced, and a lithium ion secondary battery was obtained in the same way as in Example 1 with the exception that a particulate polymer (X11) produced as described below was used instead of the particulate polymer (X1) in production of the slurry composition. Various measurements and evaluations were performed in the same manner as in Example 1. The results are shown in Table 1.

<Production of Particulate Polymer (X11)>

The particulate polymer (X11) was produced by performing the same operations as in Example 1 with the exception that a monomer composition (X11) was used instead of the monomer composition (X1) in production of the particulate polymer.

The monomer composition (X11) was produced by mixing 59.5 parts of styrene as an aromatic vinyl monomer, 20 parts of n-butyl acrylate as a (meth)acrylic acid ester monomer, and 20 parts of allyl glycidyl ether (epoxy group-containing unsaturated monomer) and 0.5 parts of ethylene glycol dimethacrylate as cross-linkable monomers.

Example 17

A functional layer-equipped separator, a positive electrode, and a negative electrode were produced, and a lithium ion secondary battery was obtained in the same way as in Example 1 with the exception that a particulate polymer (X12) produced as described below was used instead of the particulate polymer (X1) in production of the slurry composition. Various measurements and evaluations were performed in the same manner as in Example 1. The results are shown in Table 1.

<Production of Particulate Polymer (X12)>

The particulate polymer (X12) was produced by performing the same operations as in Example 1 with the exception that a monomer composition (X12) was used instead of the monomer composition (X1) in production of the particulate polymer.

The monomer composition (X12) was produced by mixing 78.5 parts of styrene as an aromatic vinyl monomer, 20 parts of n-butyl acrylate as a (meth)acrylic acid ester monomer, and 1 part of glycidyl(2-butenyl) ether (epoxy group-containing unsaturated monomer) and 0.5 parts of ethylene glycol dimethacrylate as cross-linkable monomers.

Example 18

A functional layer-equipped separator, a positive electrode, and a negative electrode were produced, and a lithium ion secondary battery was obtained in the same way as in Example 1 with the exception that a particulate polymer (X13) produced as described below was used instead of the particulate polymer (X1) in production of the slurry composition. Various measurements and evaluations were performed in the same manner as in Example 1. The results are shown in Table 1.

<Production of Particulate Polymer (X13)>

The particulate polymer (X13) was produced by performing the same operations as in Example 1 with the exception that a monomer composition (X13) was used instead of the monomer composition (X1) in production of the particulate polymer.

The monomer composition (X13) was produced by mixing 59.5 parts of styrene as an aromatic vinyl monomer, 20 parts of n-butyl acrylate as a (meth)acrylic acid ester monomer, and 20 parts of glycidyl(2-butenyl) ether (epoxy group-containing unsaturated monomer) and 0.5 parts of ethylene glycol dimethacrylate as cross-linkable monomers.

Comparative Example 1

A functional layer-equipped separator, a positive electrode, and a negative electrode were produced, and a lithium ion secondary battery was obtained in the same way as in Example 2 with the exception that application of the slurry composition onto the separator substrate to form a layer was adjusted such that the thickness of the inorganic particle layer was 3.5 μm. Various measurements and evaluations were performed in the same manner as in Example 1. The results are shown in Table 1.

Upon analysis by energy dispersive X-ray spectroscopy (SEM-EDX) (SEM main body: Ultra-55 produced by Carl Zeiss AG; EDX: Quantax-400 produced by Bruker Corporation) of a cross-section of the functional layer-equipped separator that was obtained as described above, protrusions each containing a particulate polymer at the surface thereof could not be identified in the functional layers.

TABLE 1

|  |  |  | Example 1 | Example 2 | Example 3 | Example 4 | Example 5 | Example 6 | Example 7 |
|---|---|---|---|---|---|---|---|---|---|
| Functional layer | Particulate polymer (X) | Chemical composition | ST/ 2EHA/ EDMA | ST/ 2EHA/ EDMA | ST/ 2EHA/ EDMA | BA/AN/ MMA/ EDMA | PVdF-HFP | ST/ 2EHA/ EDMA | ST/ 2EHA/ EDMA |
|  |  | Chemical composition ratio [mass %] | 81.9/18/ 0.1 | 81.9/18/ 0.1 | 81.9/18/ 0.1 | 20.9/20/ 59/0.1 | 90/10 | 81.9/18/ 0.1 | 81.9/18/ 0.1 |
|  |  | Glass-transition temperature [° C.] | 66 | 66 | 66 | 60 | — | 66 | 66 |
|  |  | Melting point [° C.] | — | — | — | — | 150 | — | — |

TABLE 1-continued

|  |  |  |  |  |  |  |  |  |  |  |
|---|---|---|---|---|---|---|---|---|---|---|
|  |  | Volume-average particle diameter [μm] |  | 6 | 3 | 9 | 6 | 6 | 6 | 6 |
|  |  | Degree of swelling in electrolyte solution [factor] |  | 2 | 2 | 2 | 14 | 7 | 2 | 2 |
|  | Binder | Particulate polymer (Y) | Chemical composition | BA/AN/ AMA/ MAA/ AGE | BA/AN/ AMA/ MAA/ AGE | BA/AN/ AMA/ MAA/ AGE | BA/AN/ AMA/ MAA/ AGE | BA/AN/ AMA/ MAA/ AGE | BAAN/ AMA/ MAA/ AGE | BA/AN/ AMA/ MAA/ AGE |
|  |  |  | Volume-average particle diameter [μm] | 0.25 | 0.25 | 0.25 | 0.25 | 0.25 | 0.25 | 0.25 |
|  |  |  | Glass-transition temperature [° C.] | −40 | −40 | −40 | −40 | −40 | −40 | −40 |
|  |  |  | Additive amount [parts by mass] | 6 | 6 | 6 | 6 | 6 | 6 | 6 |
|  |  | Water-soluble polymer | Chemical composition | — | — | — | — | — | — | — |
|  | Inorganic particles | Type |  | Alumina | Alumina | Alumina | Alumina | Alumina | Alumina | Alumina |
|  |  | Volume-average particle diameter [μm] |  | 0.5 | 0.5 | 0.5 | 0.5 | 0.5 | 0.5 | 0.5 |
|  |  | Inorganic particle layer thickness [μm] |  | 2 | 2 | 2 | 2 | 2 | 2 | 2 |
|  | Volume-average particle diameter of particulate polymer (X) relative to inorganic particle layer thickness (volume-average particle diameter of particulate polymer (X)/inorganic particle layer thickness) |  |  | 3.0 | 1.5 | 4.5 | 3.0 | 3.0 | 3.0 | 3.0 |
|  | Mixing ratio of inorganic particles and particulate polymer | Volume ratio of inorganic particles and particulate polymer (X) [inorganic particles/particulate polymer (X)] |  | 70/30 | 70/30 | 70/30 | 70/30 | 70/30 | 80/20 | 60/40 |
|  |  | Mass ratio of inorganic particles and particulate polymer (X) [inorganic particles/particulate polymer (X)] |  | 90/10 | 90/10 | 90/10 | 90/10 | 84/16 | 94/6 | 86/14 |
|  |  | Volume ratio of inorganic particles and total amount of particulate polymers (X) and (Y) [inorganic particles/particulate polymer (X) + (Y)] |  | 1.46 | 1.46 | 1.46 | 1.46 | 1.49 | 2.02 | 1.12 |
|  |  | Mass ratio of inorganic particles and total amount of particulate polymers (X) and (Y) [inorganic particles/particulate polymer (X) + (Y)] |  | 450/77 | 450/77 | 450/77 | 450/77 | 1050/263 | 2350/291 | 2150/479 |
|  | Functional layer surface properties | Proportion of protrusion-occupied area |  | 5% | 8% | 1% | 5% | 5% | 3.5% | 6.50% |
|  |  | Area proportion occupied by particulate polymer at protrusion surface |  | 100% | 100% | 100% | 100% | 100% | 100% | 100% |
|  |  | Maximum height Rz |  | 1.6 | 1.3 | 1.8 | 1.6 | 1.6 | 1.5 | 1.9 |
|  |  | Maximum height Sz |  | 8.8 | 2.6 | 11.0 | 8.2 | 8.3 | 7.0 | 9.5 |
|  |  | Arithmetic mean height Sa |  | 0.58 | 0.22 | 0.90 | 0.55 | 0.52 | 0.30 | 0.80 |
| Evaluation |  | Functional layer process adhesiveness |  | A | B | B | A | A | B | A |
|  |  | Functional layer blocking resistance |  | A | A | B | A | A | A | B |
|  |  | Functional layer heat resistance |  | A | B | A | A | A | A | B |
|  |  | Electrolyte solution injectability |  | A | A | A | B | A | A | A |
|  |  | Functional layer adhesiveness in electrolyte solution |  | C | C | C | C | B | C | B |
|  |  | Secondary battery cycle characteristics |  | A | A | A | A | A | A | A |
|  |  | Secondary battery output characteristics |  | A | A | A | B | A | A | A |
|  |  | Secondary battery preservation characteristics |  | C | C | C | C | A | C | B |

|  |  |  |  | Example 8 | Example 9 | Example 10 | Example 11 | Example 12 | Example 13 | Example 14 |
|---|---|---|---|---|---|---|---|---|---|---|
| Functional layer | Particulate polymer (X) | Chemical composition |  | ST/ 2EHA/ EDMA | ST/ 2EHA/ EDMA | ST/ 2EHA/ EDMA | ST/ 2EHA/ EDMA | ST/ 2EHA/ EDMA | ST/BA/ GMA/ EDMA | ST/BA/ GMA/ EDMA |
|  |  | Chemical composition ratio [mass %] |  | 60/39.9/ 0.1 | 89.9/10/ 0.1 | 81.9/18/ 0.1 | 81.9/18/ 0.1 | 81.9/18/ 0.1 | 78.5/20/ 1/0.5 | 59.5/20/ 20/0.5 |

TABLE 1-continued

|  |  |  |  |  |  |  |  |  |  |
|---|---|---|---|---|---|---|---|---|---|
|  |  | Glass-transition temperature [° C.] |  | 38 | 75 | 66 | 66 | 66 | 66 | 55 |
|  |  | Melting point [° C.] |  | — | — | — | — | — | — | — |
|  |  | Volume-average particle diameter [μm] |  | 6 | 6 | 6 | 6 | 6 | 6 | 6 |
|  |  | Degree of swelling in electrolyte solution [factor] |  | 2 | 2 | 2 | 2 | 2 | 2 | 2 |
|  | Binder | Particulate polymer (Y) | Chemical composition | BA/AN/ AMA/ MAA/ AGE | BA/AN/ AMA/ MAA/ AGE | 2EHA/ ST/AMA/ AA | SBR | — | BA/AN/ AMA/ MAA/ AGE | BA/AN/ AMA/ MAA/ AGE |
|  |  |  | Volume-average particle diameter [μm] | 0.25 | 0.25 | 0.30 | 0.18 |  | 0.25 | 0.25 |
|  |  |  | Glass-transition temperature [° C.] | −40 | −40 | −35 | 15 |  | −40 | −40 |
|  |  |  | Additive amount [parts by mass] | 6 | 6 | 6 | 6 | — | 6 | 6 |
|  |  | Water-soluble polymer | Chemical composition | — | — | — | — | Poval produced by Kuraray, PVA 110 | — | — |
|  | Inorganic particles | Type |  | Alumina | Alumina | Alumina | Alumina | Alumina | Alumina | Alumina |
|  |  | Volume-average particle diameter [μm] |  | 0.5 | 0.5 | 0.5 | 0.5 | 0.5 | 0.5 | 0.5 |
|  |  | Inorganic particle layer thickness [μm] |  | 2 | 2 | 2 | 2 | 2 | 2 | 2 |
|  | Volume-average particle diameter of particulate polymer (X) relative to inorganic particle layer thickness (volume-average particle diameter of particulate polymer (X)/inorganic particle layer thickness) |  |  | 3.0 | 3.0 | 3.0 | 3.0 | 3.0 | 3.0 | 3.0 |
|  | Mixing ratio of inorganic particles and particulate polymer | Volume ratio of inorganic particles and particulate polymer (X) [inorganic particles/particulate polymer (X)] |  | 70/30 | 70/30 | 70/30 | 70/30 | 70/30 | 70/30 | 70/30 |
|  |  | Mass ratio of inorganic particles and particulate polymer (X) [inorganic particles/particulate polymer (X)] |  | 90/10 | 90/10 | 90/10 | 90/10 | 90/10 | 90/10 | 90/10 |
|  |  | Volume ratio of inorganic particles and total amount of particulate polymers (X) and (Y) [inorganic particles/particulate polymer (X) + (Y)] |  | 1.46 | 1.46 | 1.46 | 1.46 | — | 1.46 | 1.46 |
|  |  | Mass ratio of inorganic particles and total amount of particulate polymers (X) and (Y) [inorganic particles/particulate polymer (X) + (Y)] |  | 450/77 | 450/77 | 450/77 | 450/77 | — | 450/77 | 450/77 |
|  | Functional layer surface properties | Proportion of protrusion-occupied area |  | 5% | 5% | 5% | 5% | 5% | 5% | 5% |
|  |  | Area proportion occupied by particulate polymer at protrusion surface |  | 100% | 100% | 100% | 100% | 100% | 100% | 100% |
|  |  | Maximum height Rz |  | 1.6 | 1.6 | 1.6 | 1.6 | 1.6 | 1.6 | 1.6 |
|  |  | Maximum height Sz |  | 8.5 | 8.3 | 8.8 | 9.0 | 8.9 | 8.6 | 8.4 |
|  |  | Arithmetic mean height Sa |  | 0.60 | 0.59 | 0.51 | 0.54 | 0.53 | 0.56 | 0.50 |
| Evaluation | Functional layer process adhesiveness |  |  | A | A | A | A | A | A | A |
|  | Functional layer blocking resistance |  |  | B | A | A | A | A | A | A |
|  | Functional layer heat resistance |  |  | A | A | A | A | A | A | A |
|  | Electrolyte solution injectability |  |  | A | A | A | A | A | A | A |
|  | Functional layer adhesiveness in electrolyte solution |  |  | C | C | C | C | C | B | A |
|  | Secondary battery cycle characteristics |  |  | A | A | A | A | B | A | A |
|  | Secondary battery output characteristics |  |  | A | A | A | A | B | A | A |
|  | Secondary battery preservation characteristics |  |  | C | C | C | C | C | B | A |

TABLE 1-continued

|  |  |  |  | Example 15 | Example 16 | Example 17 | Example 18 | Comparative Example 1 |
|---|---|---|---|---|---|---|---|---|
| Functional layer | Particulate polymer (X) | Chemical composition |  | ST/BA/ AGE/ EDMA | ST/BA/ AGE/ EDMA | ST/BA/ Glycidyl (2-butenyl) ether/ EDMA | ST/BA/ Glycidyl (2-butenyl) ether/ EDMA | ST/ 2EHA/ EDMA |
|  |  | Chemical composition ratio [mass %] |  | 78.5/20/ 1/0.5 | 59.5/20/ 20/0.5 | 78.5/20/ 1/0.5 | 59.5/20/ 20/0.5 | 81.9/18/ 0.1 |
|  |  | Glass-transition temperature [° C.] |  | 66 | 54 | 66 | 58 | 66 |
|  |  | Melting point [° C.] |  | — | — | — | — | — |
|  |  | Volume-average particle diameter [μm] |  | 6 | 6 | 6 | 6 | 3 |
|  |  | Degree of swelling in electrolyte solution [factor] |  | 2 | 2 | 2 | 2 | 2 |
|  | Binder | Particulate polymer (Y) | Chemical composition | BA/AN/ AMA/ MAA/ AGE | BA/AN/ AMA/ MAA/ AGE | BA/AN/ AMA/ MAA/ AGE | BA/AN/ AMA/ MAA/ AGE | BA/AN/ AMA/ MAA/ AGE |
|  |  |  | Volume-average particle diameter [μm] | 0.25 | 0.25 | 0.25 | 0.25 | 0.25 |
|  |  |  | Glass-transition temperature [° C.] | −40 | −40 | −40 | −40 | −40 |
|  |  |  | Additive amount [parts by mass] | 6 | 6 | 6 | 6 | 6 |
|  |  | Water-soluble polymer | Chemical composition | — | — | — | — | — |
|  | Inorganic particles | Type |  | Alumina | Alumina | Alumina | Alumina | Alumina |
|  |  | Volume-average particle diameter [μm] |  | 0.5 | 0.5 | 0.5 | 0.5 | 0.5 |
|  |  | Inorganic particle layer thickness [μm] |  | 2 | 2 | 2 | 2 | 3.5 |
|  | Volume-average particle diameter of particulate polymer (X) relative to inorganic particle layer thickness (volume-average particle diameter of particulate polymer (X)/inorganic particle layer thickness) |  |  | 3.0 | 3.0 | 3.0 | 3.0 | 0.9 |
|  | Mixing ratio of inorganic particles and particulate polymer | Volume ratio of inorganic particles and particulate polymer (X) [inorganic particles/particulate polymer (X)] |  | 70/30 | 70/30 | 70/30 | 70/30 | 70/30 |
|  |  | Mass ratio of inorganic particles and particulate polymer (X) [inorganic particles/particulate polymer (X)] |  | 90/10 | 90/10 | 90/10 | 90/10 | 90/10 |
|  |  | Volume ratio of inorganic particles and total amount of particulate polymers (X) and (Y) [inorganic particles/ particulate polymer (X) + (Y)] |  | 1.46 | 1.46 | 1.46 | 1.46 | 1.46 |
|  |  | Mass ratio of inorganic particles and total amount of particulate polymers (X) and (Y) [inorganic particles/ particulate polymer (X) + (Y)] |  | 450/77 | 450/77 | 450/77 | 450/77 | 450/77 |
|  | Functional layer surface properties | Proportion of protrusion-occupied area |  | 5% | 5% | 5% | 5% | 0% |
|  |  | Area proportion occupied by particulate polymer at protrusion surface |  | 100% | 100% | 100% | 100% | — |
|  |  | Maximum height Rz |  | 1.6 | 1.6 | 1.6 | 1.6 | 1.0 |
|  |  | Maximum height Sz |  | 8.6 | 8.4 | 8.6 | 8.4 | 2.1 |
|  |  | Arithmetic mean height Sa |  | 0.56 | 0.50 | 0.56 | 0.50 | 0.15 |
| Evaluation | Functional layer process adhesiveness |  |  | A | A | A | A | C |
|  | Functional layer blocking resistance |  |  | A | A | A | A | A |
|  | Functional layer heat resistance |  |  | A | A | A | A | B |
|  | Electrolyte solution injectability |  |  | A | A | A | A | B |
|  | Functional layer adhesiveness in electrolyte solution |  |  | B | A | B | A | C |
|  | Secondary battery cycle characteristics |  |  | A | A | A | A | C |

TABLE 1-continued

| | | | | | |
|---|---|---|---|---|---|
| Secondary battery output characteristics | A | A | A | A | B |
| Secondary battery preservation characteristics | B | A | B | A | C |

In Table 1:
"ST" indicates styrene;
"2EHA" indicates 2-ethylhexyl acrylate;
"EDMA" indicates ethylene glycol dimethacrylate;
"BA" indicates n-butyl acrylate;
"PVdF-HFP" indicates fluoropolymer latex;
"AN" indicates acrylonitrile;
"MAA" indicates methacrylic acid;
"MMA" indicates methyl methacrylate;
"AGE" indicates allyl glycidyl ether;
"AMA" indicates allyl methacrylate;
"AA" indicates acrylic acid;
"SBR" indicates styrene-butadiene copolymer; and
"GMA" indicates glycidyl methacrylate.

It can be seen from Table 1 that in Examples 1 to 18 in which a functional layer that contained inorganic particles and a particulate polymer, that had a surface maximum height Sz of not less than a specific value, and that included protrusions each containing the particulate polymer at the surface thereof was formed on a separator substrate, a functional layer-equipped separator for an electrochemical device that had excellent process adhesiveness and heat resistance and that enabled good electrolyte solution injectability was obtained.

On the other hand, although heat resistance of a functional layer and electrolyte solution injectability were good for the functional layer-equipped separator for an electrochemical device of Comparative Example 1 in which the maximum height Sz of the surface of the functional layer was less than the specific value, process adhesiveness of the functional layer was poor.

INDUSTRIAL APPLICABILITY

According to the present disclosure, it is possible to provide a functional layer-equipped separator for an electrochemical device including a functional layer that has excellent process adhesiveness and heat resistance and that enables good electrolyte solution injectability.

Moreover, according to the present disclosure, it is possible to provide an electrochemical device that can display excellent electrochemical characteristics.

REFERENCE SIGNS LIST 1 functional layer
2 separator substrate
11 inorganic particle
12 particulate polymer
13 inorganic particle layer

The invention claimed is:

1. A functional layer-equipped separator for an electrochemical device comprising: a separator substrate; and a functional layer for an electrochemical device disposed on at least one surface of the separator substrate, wherein
the functional layer for an electrochemical device contains inorganic particles and a particulate polymer,
a surface of the functional layer for an electrochemical device has a maximum height Sz of 2.5 μm or more,
the functional layer for an electrochemical device includes one or more protrusions each containing the particulate polymer at a surface thereof, and
the surface of the functional layer for an electrochemical device has an arithmetic mean height Sa of 0.2 μm or more and 0.9 μm or less.

2. The functional layer-equipped separator for an electrochemical device according to claim 1, wherein the surface of the functional layer for an electrochemical device has a maximum height Rz of 1.6 μm or more.

3. The functional layer-equipped separator for an electrochemical device according to claim 1, wherein a volume ratio of the inorganic particles and the particulate polymer in the functional layer for an electrochemical device, expressed as inorganic particles/particulate polymer, is not less than 1.1 and not more than 2.1.

4. The functional layer-equipped separator for an electrochemical device according to claim 1, wherein the particulate polymer has a degree of swelling in electrolyte solution of not less than a factor of 1 and not more than a factor of 15.

5. The functional layer-equipped separator for an electrochemical device according to claim 1, wherein the particulate polymer satisfies 1) or 2):
1) The particulate polymer has a glass-transition temperature of not lower than 15° C. and not higher than 90° C.;
2) The particulate polymer has a melting point of 50° C. or higher.

6. The functional layer-equipped separator for an electrochemical device according to claim 1, wherein the particulate polymer includes an epoxy group-containing unsaturated monomer unit.

7. The functional layer-equipped separator for an electrochemical device according to claim 6, wherein proportional content of the epoxy group-containing unsaturated monomer unit in the particulate polymer is not less than 0.5 mass % and not more than 30.0 mass %.

8. An electrochemical device comprising the functional layer-equipped separator for an electrochemical device according to claim 1.

9. The functional layer-equipped separator for an electrochemical device according to claim 1, wherein the particulate polymer includes an aromatic vinyl monomer unit, wherein a proportional content of the aromatic vinyl monomer unit in the particulate polymer is not less than 30 mass % and not more than 95 mass %.

10. The functional layer-equipped separator for an electrochemical device according to claim 1, wherein the surface of the functional layer for an electrochemical device has an arithmetic mean height Sa of 0.2 μm or more and 0.8 μm or less.

11. The functional layer-equipped separator for an electrochemical device according to claim 1, wherein the surface of the functional layer for an electrochemical device has a maximum height Sz of 2.5 μm or more and 15.0 μm or less.

* * * * *